(12) United States Patent
Filippov et al.

(10) Patent No.: US 11,985,304 B2
(45) Date of Patent: May 14, 2024

(54) METHOD AND APPARATUS OF LOCAL ILLUMINATION COMPENSATION FOR PREDICTIVE CODING

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 303 days.

(21) Appl. No.: 17/379,601

(22) Filed: Jul. 19, 2021

(65) Prior Publication Data

US 2021/0352277 A1   Nov. 11, 2021

Related U.S. Application Data

(63) Continuation of application No. PCT/RU2020/050004, filed on Jan. 17, 2020.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/117; H04N 19/132; H04N 19/159; H04N 19/167;
(Continued)

(56) References Cited

U.S. PATENT DOCUMENTS 8,207,955 B2   6/2012   Morimoto
2010/0073340 A1   3/2010   Morimoto
(Continued)

FOREIGN PATENT DOCUMENTS

| CN | 102215389 A | 10/2011 |
| CN | 107147911 A | 9/2017 |
| EP | 3160141 A1 | 4/2017 |

OTHER PUBLICATIONS

"Algorithm Description of Joint Exploration Test Model 4" Joint Video Exploration Team (JVET) of ITU-T SG 16 WP 3 and ISO/IEC JTC 1/SC 29/WG 11 4th Meeting: Chengdu, CN, Oct. 15-21, 2016, Document: JVET-D1001_v3. (Year: 2016).*
(Continued)

*Primary Examiner* — Nathnael Aynalem
(74) *Attorney, Agent, or Firm* — Leydig, Voit & Mayer, Ltd.

(57) ABSTRACT

Illumination compensation can be performed for inter prediction coding of a picture, e.g. for video encoding and decoding. The illumination compensation may include: obtaining inter-predicted sample values for a current block of the picture; obtaining a first target value and a second target value of neighboring samples from a set of neighboring samples of a reference block, wherein the set includes neighboring samples of at least one reference block of the current block, and obtaining corresponding positions A of the sample having the first target value and B of the sample having the second target value relative to the position of the reference block; obtaining respective values of neighboring samples of the current block at the obtained positions A and B relative to the position of the current block; obtaining values of updating parameters using the calculated values; and updating the inter-predicted sample values based on the updating parameters.

13 Claims, 22 Drawing Sheets

Related U.S. Application Data

(60) Provisional application No. 62/825,013, filed on Mar. 27, 2019, provisional application No. 62/818,765, filed on Mar. 15, 2019, provisional application No. 62/817,556, filed on Mar. 12, 2019, provisional application No. 62/816,908, filed on Mar. 11, 2019, provisional application No. 62/794,498, filed on Jan. 18, 2019.

(51) Int. Cl.
 *H04N 19/159* (2014.01)
 *H04N 19/176* (2014.01)

(58) Field of Classification Search
 CPC .... H04N 19/176; H04N 19/82; H04N 19/172; H04N 19/182; H04N 19/50; H04N 19/503; H04N 19/51; H04N 19/513; H04N 19/543; H04N 19/54; H04N 19/537; H04N 19/577; H04N 19/55; H04N 19/587; H04N 19/59; H04N 19/593
 USPC ........................................ 375/240.01–240.29
 See application file for complete search history.

(56) References Cited

U.S. PATENT DOCUMENTS

| | | |
|---|---|---|
| 2012/0268437 A1 | 10/2012 | Lee |
| 2013/0163666 A1 | 6/2013 | Leontaris et al. |
| 2018/0063531 A1 | 3/2018 | Hu et al. |
| 2018/0077426 A1* | 3/2018 | Zhang .................. H04N 19/157 |
| 2018/0098086 A1 | 4/2018 | Chuang et al. |
| 2019/0215522 A1* | 7/2019 | Zhang .................. H04N 19/159 |
| 2020/0154100 A1* | 5/2020 | Zhao ..................... H04N 19/46 |
| 2020/0195976 A1* | 6/2020 | Zhao ..................... H04N 19/593 |
| 2020/0374513 A1* | 11/2020 | Xiu ....................... H04N 19/625 |
| 2021/0289215 A1* | 9/2021 | Helmrich ............. H04N 19/186 |

OTHER PUBLICATIONS

Laroche et al., "Non-CE3: On cross-component linear model simplification," Joint Video Experts Team (JVET) of ITU-T SG 16 WP 3 and ISO/IEC JTC 1/SC 29/WG 11, 11th Meeting: Ljubljana, SI, JVET-K0204-v3, Total 7 pages, International Union of Telecommunication, Geneva, Switzerland (Jul. 10-18, 2018).

Ma et al., "CE3-related: Classification-based mean value for CCLM coefficients derivation," Joint Video Experts Team (JVET) of ITU-T SG 16 WP 3 and ISO/IEC JTC 1/SC 29/WG 11, 12th Meeting: Macao, CN, JVET-L0342_r2, Total 5 pages, International Union of Telecommunication, Geneva, Switzerland (Oct. 3-12, 2018).

Li et al., "An adaptive local illumination compensation method of multi-view video coding," Journal of Chongqing University of Posts and Telecommunications (Natural Science Edition), vol. 25, No. 6, Total 6 pages (Dec. 2013). With an English abstract.

Tsai et al., "CE10-related: Simplification of local illumination compensation," Joint Video Experts Team (JVET) of ITU-T SG 16 WP 3 and ISO/IECJTC 1/SC 29/WG11, 13th Meeting: Marrakech, MA, Document: JVET-M0182-v2, XP030200849, total 5 pages (Jan. 9-18, 2019).

"Series H: Audiovisual and Multimedia Systems, Infrastructure of audiovisual services-Coding of moving video, Advanced video coding for generic audiovisual services," ITU-T H.264 (Apr. 2017), total 812 pages, International Telecommunication Union, Geneva, Switzerland (Apr. 2017).

Liu et al., "Local Illumination Compensation," ITU—Telecommunications Standardization Sector Study Group 16 Question 6, Video Coding Experts Group(VCEG), 52nd Meeting: Warsaw, Poland, Document VCEG-AZ06, XP030003884, total 4 pages (Jun. 19-26, 2015).

"Series H: Audiovisual and Multimedia Systems Infrastructure of audiovisual services—Coding of moving video, High efficiency video coding," ITU-T H.265 (Feb. 2018), total 692 pages, International Telecommunication Union, Geneva, Switzerland (Feb. 2018).

\* cited by examiner

METHOD AND APPARATUS OF LOCAL ILLUMINATION COMPENSATION FOR PREDICTIVE CODING

CROSS-REFERENCE TO RELATED APPLICATIONS

This application is a continuation of International Application No. PCT/RU2020/050004, filed on Jan. 17, 2020, which claims priority of U.S. Provisional Patent Application No. 62/794,498, filed Jan. 18, 2019, and U.S. Provisional Patent Application No. 62/825,013, filed Mar. 27, 2019, and U.S. Provisional Patent Application No. 62/817,556, filed Mar. 12, 2019, and U.S. Provisional Patent Application No. 62/818,765, filed Mar. 15, 2019, and U.S. Provisional Patent Application No. 62/816,908, filed Mar. 11, 2019. All of the aforementioned patent applications are hereby incorporated by reference in their entireties.

FIELD

Embodiments of the present disclosure generally relate to the field of picture processing and more particularly to an illumination compensation technique for inter-prediction coding.

BACKGROUND

Video coding (video encoding and decoding) is used in a wide range of digital video applications, for example broadcast digital TV, video transmission (e.g., over internet and mobile networks), real-time conversational applications (such as video chat, video conferencing, DVD and Blu-ray discs), video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modem day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

SUMMARY

Embodiments of the present disclosure provide apparatuses and methods for illumination compensation for inter prediction coding (encoding and/or decoding) of a picture according to the independent claims.

Embodiments of the present disclosure facilitate an efficient illumination compensation.

An aspect of the present disclosure provides: a method for illumination compensation for inter prediction coding of a picture. The method includes:

obtaining inter-predicted sample values for a current block of the picture, using motion compensation;

obtaining a first target value ($x_A$) and a second target value ($x_B$) of neighboring samples from a set L of neighboring samples of a reference block, the reference block being a reference block of the current block, wherein the set L comprises all or part of all neighboring samples of at least one reference block of the current block, and obtaining corresponding positions A of the sample having the first target value and B of the sample having the second target value relative to the position of the reference block;

obtaining respective values of neighboring samples ($y_A$, $y_B$) of the current block at the obtained positions A and B relative to the position of the current block;

obtaining the values of updating parameters using the calculated values; and updating the values of the inter-predicted samples based on updating parameters.

It should be understood that reference samples may be neighboring samples itself or may be calculated values based on or from neighboring samples, but the present disclosure is not limited to those. For example, two reference blocks may correspond to two reference images.

In a possible implementation form of the method according to the previous aspect as such, the first target value ($x_A$) and the second target value ($x_B$) may correspond to a minimum value ($x_A$) and a maximum value ($x_B$) of neighboring samples of the at least one reference block, respectively.

In a possible implementation form of the method according to any preceding implementation of the previous aspect or the previous aspect as such, the position A may correspond to the smallest luma value, and the position B may correspond to the largest luma value of the neighboring samples of the at least one reference block, respectively.

In a possible implementation form of the method according to any preceding implementation of the previous aspect or the previous aspect as such, the respective values of neighboring samples ($y_A$, $y_B$) may be obtained from a set C of neighboring samples of the current block, and the set C may comprise all or part of all neighboring samples.

In a possible implementation form of the method according to the previous aspect as such, both sets L and C may comprise the same neighboring samples with regard to their relative position to the respective block L and C.

In a possible implementation form of the method according to any preceding implementation of the previous aspect or the previous aspect as such, the neighboring samples may be neighboring reconstructed samples.

In a possible implementation form of the method according to any preceding implementation of the previous aspect or the previous aspect as such, the method may further comprise:

determining prediction modes for blocks neighboring to left and top side of predicted block;

determining the sampling template (T) on the basis of the determined prediction modes of blocks neighboring to left and top side of predicted block;

determining a set of reconstructed samples (S) that are neighboring to the left side or to the top side of the predicted block and that have a position relative to the predicted block that is permitted by the sampling template T;

determining a set of reference samples (R) that are neighboring to the left side or to the top side of the reference area and that have a position relative to the reference area that is permitted by the sampling template T;

deriving parameters of a linear model using samples of the set of reference samples R as reference values and reconstructed samples of the set of reconstructed samples S as target values; and applying a linear transformation to the samples of the predicted block, wherein parameters of the linear transformation are the derived parameters of the linear model.

In a possible implementation form of the method according to the previous aspect as such, the deriving of the parameters of linear model may comprise the following steps:

obtaining the first target value ($x_A$) and the second target value ($x_B$) of the reference samples such as neighboring samples of the at least one reference block and the corresponding position A of the reference sample having the first target value and the corresponding position B of the reference sample having the second target value relative to the position of the reference block;

obtaining respective values ($y_A$, $y_B$) of reference samples such as neighboring samples of the current block at the corresponding positions A and B relative to the position of the current block;

obtaining or deriving the values of updating parameters based on the values of the reference samples, wherein the values of the reference samples comprise one or more of the first target value ($x_A$) and the second target value ($x_A$) of the reference sample of the reference block, and the values of the reference samples ($y_A$, $y_B$) of the current block at the corresponding positions A and B; and updating the values of the inter-predicted samples based on the values of the updating parameters.

In a possible implementation form of the method according to any preceding implementation of the previous aspect or the previous aspect as such, the updating parameters may be α and β, and the values of the updating parameters α and β may be obtained using the calculated values according to the following equations:

$$\alpha = \frac{y_B - y_A}{x_B - x_A} \quad (E1)$$

$$\beta = y_A - \alpha x_A. \quad (E2)$$

In a possible implementation form of the method according to the previous aspect as such, the values of the inter-predicted samples may be updated as follows:

pred'(x,y)=α·pred(x,y)+β

In a possible implementation form of the method according to any preceding implementation of the previous aspect or the previous aspect as such, the position A and position B may be selected from a subset of the set L of neighboring samples of the reference block.

In a possible implementation form of the method according to the previous aspect as such, L may comprise all neighboring samples at integer pixel positions.

In a possible implementation form of the method according to any preceding implementation of the two previous aspects or the previous aspect as such, a second-smallest value ($x_{A'}$) and a second-largest value ($x_{B'}$), of the neighboring samples of the reference block may be additionally used for calculating the updating parameters.

In a possible implementation form of the method according to the previous aspect as such, the second-smallest value ($x_{A'}$) of the neighboring samples of the reference block may correspond to a luma value at a position A', and the second-largest value ($x_{B'}$) of the neighboring samples of the reference block may correspond to a luma value at a position B'.

In a possible implementation form of the method according to any preceding implementation of the previous six aspects or the previous five aspects when dependent on the previous sixth aspect or the previous aspect as such, a lookup table, LUT, may be used to derive parameter α, the lookup table may comprise the results of the division derivation as specified for α according to equation (E1).

In a possible implementation form of the method according to the previous aspect as such, wherein the lookup table may be linearly mapped to the difference $x_B-x_A$.

In a possible implementation form of the method according to the previous aspect as such, the lookup table may be non-linearly mapped to the difference: $x_B-x_A$.

In a possible implementation form of the method according to any preceding implementation of the previous three aspects or the previous aspect as such, the lookup table may comprise the values of significands.

In a possible implementation form of the method according to any preceding implementation of the previous aspect or the previous aspect as such, the set of neighboring samples of the reference block and a set of neighboring samples of the current block may not include all neighboring samples, but may include samples adjacent to the corner and the middle of the reference and current block.

In a possible implementation form of the method according to any preceding implementation of the previous aspect or the previous aspect as such, the set of neighboring samples of the reference block, set L, and a set of neighboring samples of the current block, set C, may not include all neighboring samples, but may only include samples adjacent to the corner and the middle of the reference and current block.

In a possible implementation form of the method according to any preceding implementation of the previous aspect or the previous aspect as such, a set of neighboring samples of the reference block and a set of neighboring samples of the current block may not include all neighboring samples, but may include samples that have a distance to the top-left corner exceeding a given threshold.

In a possible implementation form of the method according to the previous aspect as such, the threshold may be defined as ¼ of a side length of the current block.

In a possible implementation form of the method according to any preceding implementation of the previous aspect or the previous aspect as such, the set of neighboring samples of the reference block, set L, and the set of neighboring samples of the current block, set C, may not include all neighboring samples, but may only include samples that have a distance to the top-left corner exceeding the given threshold.

In a possible implementation form of the method according to any preceding implementation of the previous six aspects or the previous aspect as such, both set L as well as set C may not include all neighboring sample at integer pixel positions.

In a possible implementation form of the method according to any preceding implementation of the previous aspect or the previous aspect as such, two or more reference blocks may be used for motion compensation and for obtaining the updating parameters.

In a possible implementation form of the previous aspect as such, the motion compensation may be Local Illumination Compensation, LIC.

In a possible implementation form of the method according to any preceding implementation of the previous aspect or the previous aspect as such, templates of the current and reference blocks may be used without downsampling them.

In a possible implementation form of the method according to any preceding implementation of the previous aspect or the previous aspect as such, top and left template samples of the current and reference blocks may be filtered before linear model parameter derivation or linear model coefficient derivation.

In a possible implementation form of the method according to any preceding implementation of the previous aspect or the previous aspect as such, linear model parameter derivation or linear model coefficient derivation may be unified for cross-component prediction, CCLM, and local illumination compensation, LIC.

In a possible implementation form of the method according to any preceding implementation of the previous aspect or the previous aspect as such, the first target value and the second target value of reference samples of the reference block may be respectively a minimum value ($x_A$) and a maximum value ($x_B$) of a second set of neighboring samples of the reference block; and the position A of the reference sample having the first target value and the position B of the reference sample having the second target value may be a corresponding position A of the neighboring sample having the minimum value and a corresponding position B of the neighboring sample having the maximum value relative to the position of the reference block.

In a possible implementation form of the method according to any preceding implementation of the previous aspect or the previous aspect as such, the first target value may be a first averaged value of the smallest sample value A and the second-smallest sample value A' of the second set of neighboring samples of the reference block; the second target value may be a second averaged value of the largest sample value B and the second-largest sample value B' of the second set of neighboring samples of the reference block; and the position A of the reference sample having the first target value and the position B of the reference sample having the second target value may be a corresponding position of the neighboring sample having the first averaged value and a corresponding position of the neighboring sample having the second averaged value relative to the position of the reference block.

In a possible implementation form of the method according to any preceding implementation of the previous aspect or the previous aspect as such, the values of reference samples further may comprise a mean value of top template samples and left template samples of the current block and a mean value of top template samples and left template samples of the reference block.

In a possible implementation form of the method according to any preceding implementation of the previous aspect or the previous aspect as such, when the quantity of reference samples having the minimum value may be Q among the second set of neighboring samples of the reference block, the corresponding position A of the reference sample may be the reference sample having the minimum value and having the maximum distance to the top-left corner of the reference block, and/or the corresponding position B of the reference sample may be the reference sample having the maximum value and having the maximum distance to the top-left corner of the reference block.

In a possible implementation form of the method according to any preceding implementation of the previous aspect or the previous aspect as such, the updating parameters such as ($\alpha$ and/or $\beta$) may be derived from the value of a first set of reference samples of the current block and the value of a second set of reference samples of the reference block by using mean calculation.

The present disclosure also provides a method for illumination compensation for inter prediction coding. The method includes:

obtaining inter-predicted sample values for a current block using motion compensation;

obtaining or deriving values of first and second updating parameters (such as $\alpha$ and $\beta$) based on the value of a first set of reference samples (such as neighboring samples) of the current block and the value of a second set of reference samples (such as neighboring samples) of the reference block, wherein the value of the first updating parameter (such as $\alpha$) is obtained (or derived or calculated) by using the MinMax method, and the value of the second updating parameter (such as $\beta$) is obtained by mean calculation; and updating the values of the inter-predicted samples based on the values of the first and second updating parameters (such as $\alpha$ and $\beta$).

In a possible implementation form of the method according to any preceding implementation of the previous aspect or the previous aspect as such, the value of the first updating parameter (such as $\alpha$) may be obtained based on a minimum value ($x_A$) and a maximum value ($x_B$) of the second set of reference samples of the reference block, and respective values ($y_A$, $y_B$) of reference samples of the first set of reference samples of the current block at corresponding positions A and B of the minimum value ($x_A$) and maximum value ($x_B$).

In a possible implementation form of the method according to any preceding implementation of the previous aspect or the previous aspect as such, the value of the first updating parameter such as $\alpha$ may be obtained based on a minimum value ($x_A$) and a maximum value ($x_B$) of the second set of reference samples of the reference block, and respective values ($y_A$, $y_B$) of reference samples such as neighboring samples of the first set of reference samples of the current block at corresponding positions A and B relative to the position of the current block; the corresponding position A of the reference sample may have the minimum value and the corresponding position B of the reference sample may have the maximum value relative to the position of the reference block.

In a possible implementation form of the method according to any preceding implementation of the previous aspect or the previous aspect as such, the value of the first updating parameter such as $\alpha$ may be obtained based on a first averaged value of the smallest sample value (A) and the second-smallest sample value (A') of the second set of reference samples of the reference block and a second averaged value of the largest sample value (B) and the second-largest sample value (B') of the second set of neighboring samples of the reference block, and respective values ($y_A$, $y_B$) of reference samples such as neighboring samples of the first set of reference samples of the current block at corresponding positions A and B of the first averaged value and the second averaged value.

In a possible implementation form of the method according to any preceding implementation of the previous aspect or the previous aspect as such, the value of the first updating parameter such as $\alpha$ may be obtained based on a first averaged value of the smallest sample value (A) and the second-smallest sample value (A') of the second set of reference samples of the reference block and a second averaged value of the largest sample value (B) and the second-largest sample value (B') of the second set of reference samples such as neighboring samples of the reference block, and respective values ($y_A$, $y_B$) of reference samples such as neighboring samples of the first set of reference samples of the current block at corresponding positions A and B relative to the position of the current block; the corresponding position A of the reference sample may have the first averaged value and the corresponding position B of the reference sample may have the second averaged value relative to the position of the reference block.

In a possible implementation form of the method according to any preceding implementation of the previous aspect or the previous aspect as such, the value of a second parameter such as β may be obtained based on a mean value of a first set of reference samples such as neighboring reconstructed samples of the current block and a mean value of a second set of reference samples such as neighboring reconstructed samples of the reference block.

In a possible implementation form of the method according to any preceding implementation of the previous aspect or the previous aspect as such, in case a first template sample range such as W is larger than a second template sample range such as H, a mean value of a second set of reference samples such as neighboring reconstructed samples of the reference block may be obtained using the following equation:

$$\text{Mean} = \frac{\left(\sum_{i=0}^{W+H-1} p_i\right) + ((W+H) \gg 1)}{W+H} \approx \frac{\left(\sum_{i=0}^{W-1} p_i\right) + (W \gg 1)}{W} = \left(\left(\sum_{i=0}^{W-1} p_i\right) + (W \gg 1)\right) \gg w; \quad (E3)$$

in case a second template sample range such as H is larger than a first template sample range such as W, a mean value of a second set of reference samples such as neighboring reconstructed samples of the reference block may be obtained using the following equation:

$$\text{Mean} = \frac{\left(\sum_{i=0}^{W+H-1} p_i\right) + ((W+H) \gg 1)}{W+H} \approx \frac{\left(\sum_{i=0}^{H-1} p_i\right) + (H \gg 1)}{H} = \left(\left(\sum_{i=0}^{H-1} p_i\right) + (H \gg 1)\right) \gg h; \quad (E4)$$

in case a second template sample range such as H is equal to a first template sample range such as W, a mean value of a second set of reference samples such as neighboring reconstructed samples of the reference block may be obtained using the following equation:

$$\text{Mean} = \frac{\left(\sum_{i=0}^{W+H-1} p_i\right) + (W+H)}{W+H} = \frac{\left(\sum_{i=0}^{W+H-1} p_i\right) + (W \ll 1)}{2W} = \left(\left(\sum_{i=0}^{W+H-1} p_i\right) + (W \ll 1)\right) \gg (w+1). \quad (E5)$$

In a possible implementation form of the method according to any preceding implementation of the previous aspect or the previous aspect as such, in case a first template sample range such as W is larger than a second template sample range such as H, a mean value of a first set of reference samples such as neighboring reconstructed samples of the current block may be obtained using the following equation:

$$\text{Mean} = \frac{\left(\sum_{i=0}^{W+H-1} p_i\right) + ((W+H) \gg 1)}{W+H} \approx \frac{\left(\sum_{i=0}^{W-1} p_i\right) + (W \gg 1)}{W} = \left(\left(\sum_{i=0}^{W-1} p_i\right) + (W \gg 1)\right) \gg w; \quad (E6)$$

in case a second template sample range such as H is larger than a first template sample range such as W, a mean value of a first set of reference samples such as neighboring reconstructed samples of the current block may be obtained using the following equation:

$$\text{Mean} = \frac{\left(\sum_{i=0}^{W+H-1} p_i\right) + ((W+H) \gg 1)}{W+H} \approx \frac{\left(\sum_{i=0}^{H-1} p_i\right) + (H \gg 1)}{H} = \left(\left(\sum_{i=0}^{H-1} p_i\right) + (H \gg 1)\right) \gg h; \quad (E7)$$

when a second template sample range such as H is equal to a first template sample range such as W, a mean value of a first set of reference samples such as neighboring reconstructed samples of the current block may be obtained using the following equation:

$$\text{Mean} = \frac{\left(\sum_{i=0}^{W+H-1} p_i\right) + (W+H)}{W+H} = \frac{\left(\sum_{i=0}^{W+H-1} p_i\right) + (W \ll 1)}{2W} = \left(\left(\sum_{i=0}^{W+H-1} p_i\right) + (W \ll 1)\right) \gg (w+1). \quad (E8)$$

In a possible implementation form of the method according to any preceding implementation of the previous aspect or the previous aspect as such, the first set of reference samples such as neighboring reconstructed samples of the current block may comprise a part or whole of the top and left template samples of the current block;

the second set of reference samples such as neighboring reconstructed samples of the reference block may comprise a part or whole of the top and left template samples of the reference block.

In a possible implementation form of the method according to any preceding implementation of the previous aspect or the previous aspect as such, the top and left template samples of the current and reference blocks may be filtered before updating parameter derivation or linear model parameter derivation;

the first set of reference samples of the current block may be filtered before updating parameter derivation or linear model parameter derivation; or the second set of reference samples of the reference block may be filtered before updating parameter derivation or linear model parameter derivation.

In a possible implementation form of the method according to any preceding implementation of the previous aspect or the previous aspect as such implemented by an encoding device.

In a possible implementation form of the method according to any preceding implementation of the previous aspects or the previous aspect as such implemented by a decoding device.

The present disclosure further provides an encoder comprising processing circuitry for carrying out the method according to any one of the previous method aspects.

The present disclosure further provides a decoder comprising processing circuitry for carrying out the method according to any one of the previous method aspects.

The present disclosure further provides a computer program product comprising a program code for performing the method according to any one of the previous method aspects.

The present disclosure further provides a decoder, comprising:
one or more processors; and
a non-transitory computer-readable storage medium coupled to the processors and storing programming for execution by the processors, wherein the programming, when executed by the processors, configures the decoder to carry out the method according to any one of the previous method aspects.

The present disclosure further provides an encoder, comprising:
one or more processors; and
a non-transitory computer-readable storage medium coupled to the processors and storing programming for execution by the processors, wherein the programming, when executed by the processors, configures the encoder to carry out the method according to any one of the previous method aspects.

The present disclosure also provides an apparatus for illumination compensation for inter prediction coding, comprising:
a first obtaining unit, configured for obtaining inter-predicted sample values for a current block using motion compensation;
a second obtaining unit, configured for obtaining a first target value ($x_A$) and a second target value ($x_B$) of reference samples (such as neighboring samples) of at least one reference block and a corresponding position A of the reference sample having the first target value and a corresponding position B of the reference sample having the second target value relative to the position of the reference block;
a third obtaining unit, configured for obtaining respective values ($y_A$, $y_B$) of reference samples such as neighboring samples of the current block at the corresponding positions A and B relative to the position of the current block;
a fourth obtaining unit, configured for obtaining or deriving the values of updating parameters such as $\alpha$ and $\beta$ based on the values of reference samples, wherein the values of reference samples comprises one or more of the first target value ($x_A$) and the second target value ($x_B$) of the reference sample of the reference block, and the values of reference samples ($y_A$, $y_B$) of the current block at the corresponding positions A and B; and an updating unit, configured for updating the values of the inter-predicted samples based on the values of the updating parameters such as $\alpha$ and $\beta$.

The present disclosure also provides an apparatus for illumination compensation for inter prediction coding, comprising:
a first obtaining unit, configured for obtaining inter-predicted sample values for a current block using motion compensation;
a second obtaining unit, configured for obtaining values of first and second updating parameters such as $\alpha$ and $\beta$ based on the value of a first set of reference samples (such as neighboring samples) of the current block and the value of a second set of reference samples such as neighboring samples of the reference block, wherein the value of the first updating parameter such as $\alpha$ is obtained by using a first method, and the value of the second updating parameter such as $\beta$ is obtained by using a second method; and an updating unit, configured for updating the values of the inter-predicted samples based on the values of the first and second updating parameters such as $\alpha$ and $\beta$.

The present disclosure further provides a method for illumination compensation of a predicted block for inter prediction coding, comprising:
deriving prediction modes of neighboring blocks of a current block, wherein the neighboring blocks are on the top or left side of the current block;
determining availability of one or more samples in the neighboring blocks based on the prediction modes, wherein the one or more samples are adjacent to the top or left boundary of the current block;
deriving a first sample set, wherein the first sample set comprises first samples determined as available;
deriving a second sample set, wherein the second sample set comprises second samples, wherein each second sample corresponds to each first sample, wherein a position relationship between each second sample and a reference block is the same as a position relationship between the corresponding first sample and the current block, and wherein the reference block corresponds to the current block;
calculating one or more parameters based on the first sample set and the second sample set; and
applying linear transform to samples in the current block with the one or more parameters.

In a possible implementation form of the method according to the previous aspect as such, the determining of the availability of the one or more samples in the neighboring blocks based on the prediction modes may comprise: determining the one or more samples in one of the neighboring blocks are available, in the case the prediction mode of the neighboring block is inter mode.

In a possible implementation form of the method according to any preceding implementation of the previous aspect or the previous aspect as such, the determining of the availability of the one or more samples in the neighboring blocks based on the prediction modes may include: determining the one or more samples in one of the neighboring blocks may be unavailable, in the case the prediction mode of the neighboring block is not inter mode.

In a possible implementation form of the method according to any preceding implementation of the previous aspect or the previous aspect as such, the prediction mode of the neighboring block is not inter mode, and the method may comprise: the prediction mode of the neighboring block is intra mode, combined intra-inter prediction mode, CIIP, intra block copy mode, IBC, or a mode based on current picture referencing, CPR, mechanisms.

In a possible implementation form of the method according to any preceding implementation of the previous four aspects or the previous as such, the method may be disabled in the case one or more predetermined conditions are satisfied, and the predetermined conditions may comprise:

the current block contains less than 64 samples; or
the current block is predicted using a sub-block mode or bi-prediction; or
the width or the height of the current block is 128 samples; or
the prediction modes of neighboring reconstructed blocks on the top-left corner and adjacent to the top or left boundary of the current block are not inter mode; or all prediction modes of neighboring reconstructed blocks adjacent to the top or left boundary of the current block are not inter mode; or the prediction modes of neighboring reconstructed blocks on preset position and adjacent to the top or left boundary of the current block are not inter mode.

In a possible implementation form of the method according to the previous aspect as such, the sub-block mode may comprise triangle mode or BDOF mode.

In a possible implementation form of the method according to the aspect before the previous aspect, for a block of size W×H the preset position may comprise one or more of positions A, B1, B2, C, D, E, F1, F2 or G, wherein A, B1, B2, C, D, E, F1, F2 and G are defined as shown in FIG. 21.

Details of one or more exemplary embodiments are set forth in the accompanying drawings and the description below. Other features, objects, and advantages will be apparent from the description, drawings, and claims.

BRIEF DESCRIPTION OF THE DRAWINGS

In the following, exemplary embodiments of the disclosure are described in more detail with reference to the attached figures and drawings, in which.

Figure 1A:
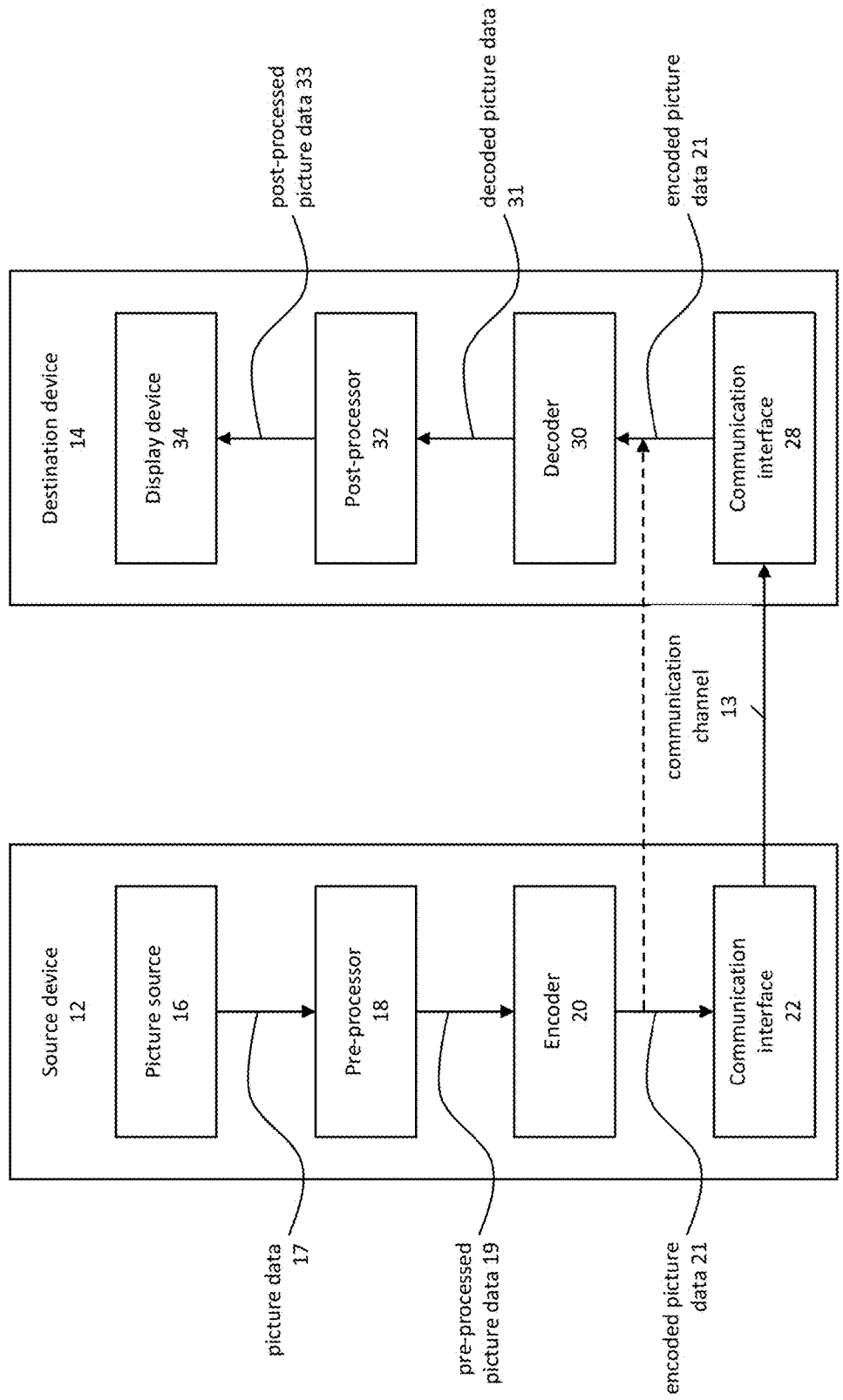
FIG. 1A is a block diagram showing an example of a video coding system configured to implement embodiments of the present disclosure.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
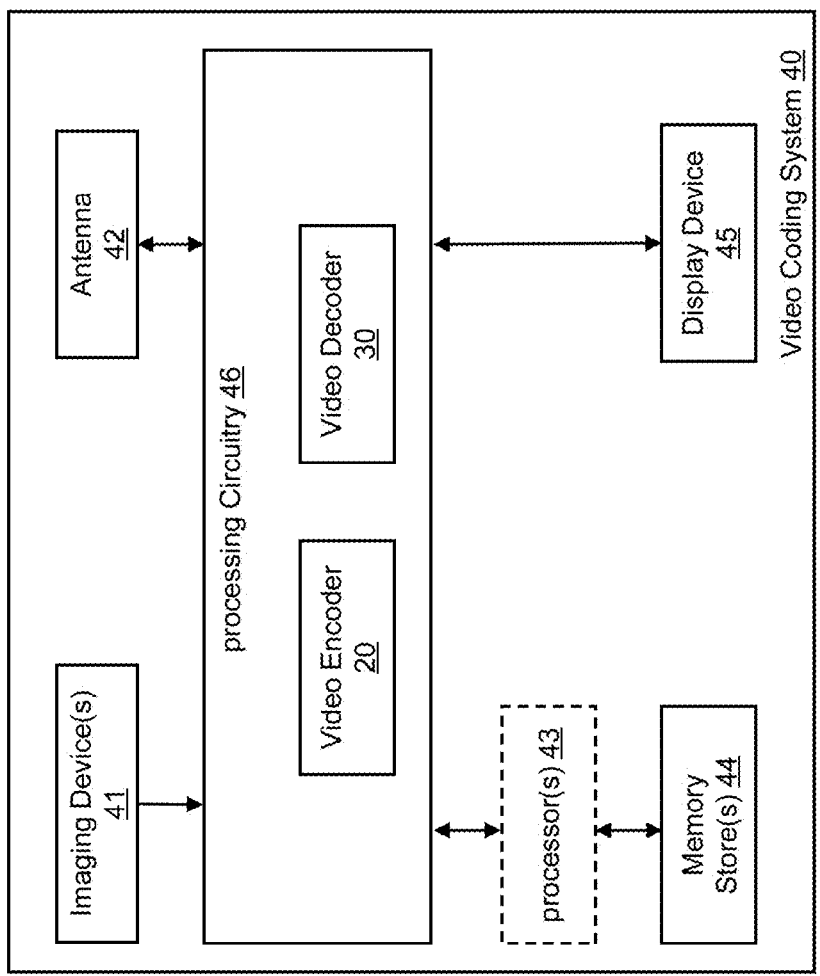
FIG. 1B is a block diagram showing another example of a video coding system configured to implement embodiments of the present disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the present disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Encoder and Encoding Method

Figure 2:
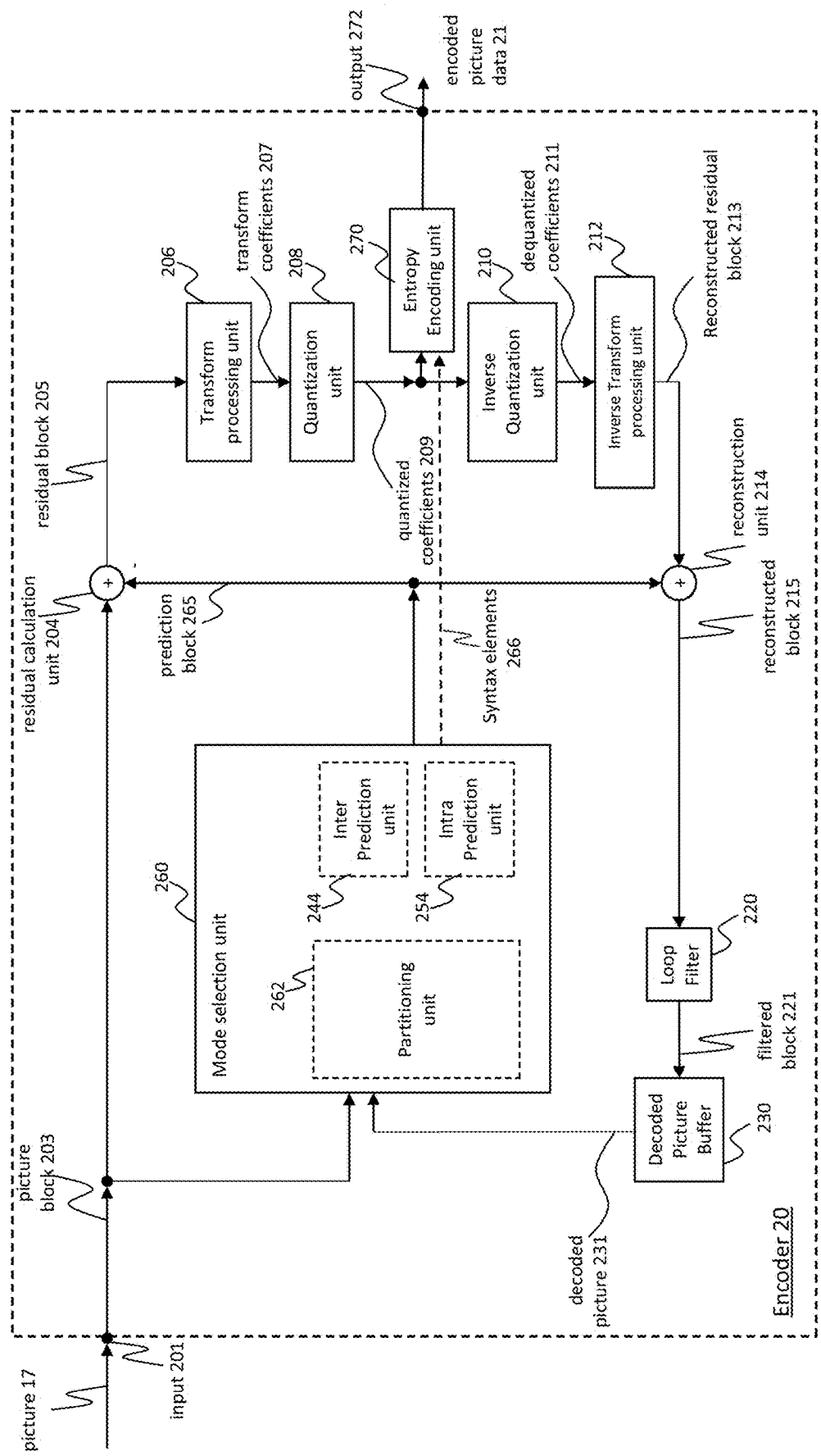
FIG. 2 is a block diagram showing an example of a video encoder configured to implement embodiments of the present disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
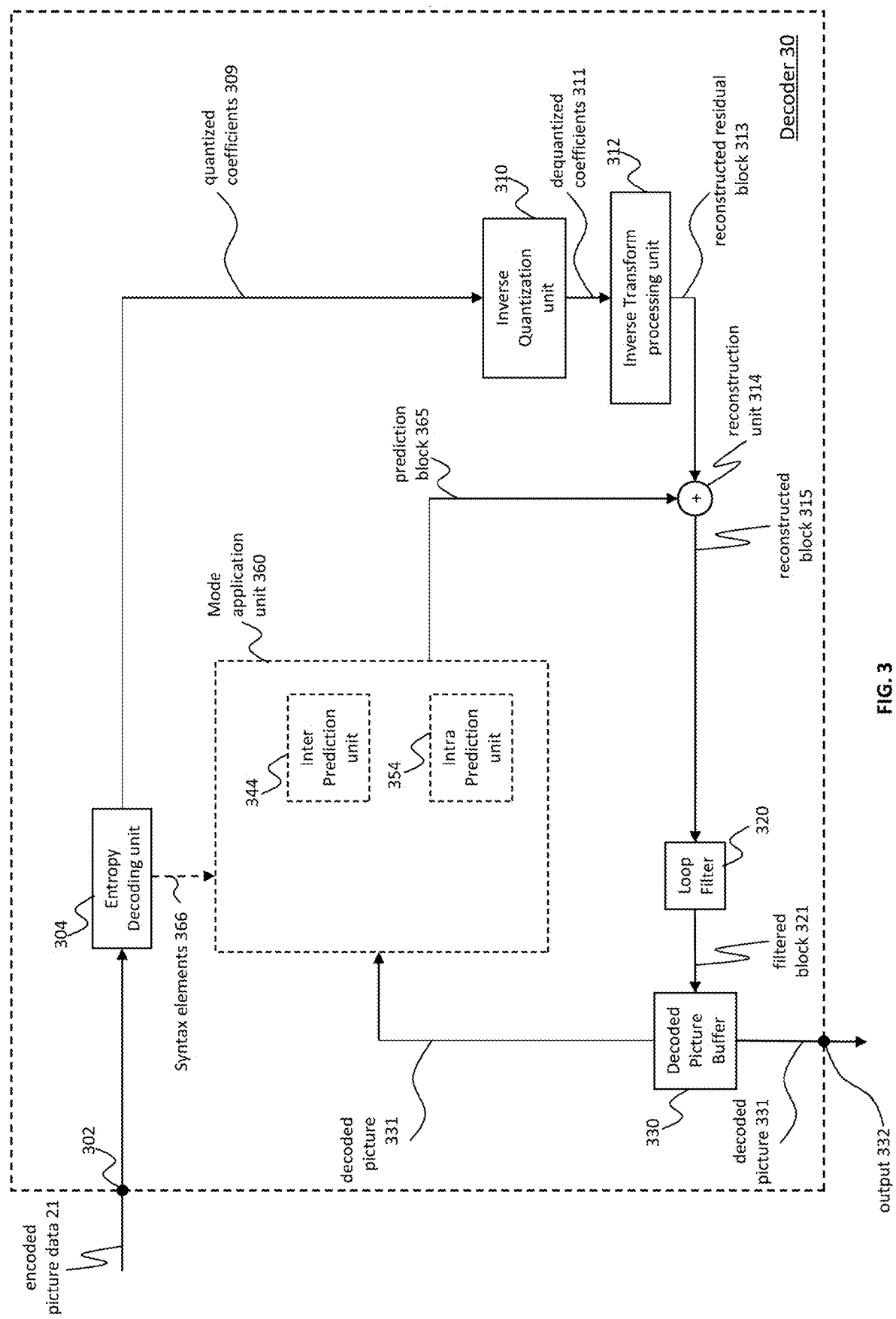
FIG. 3 is a block diagram showing an example structure of a video decoder configured to implement embodiments of the present disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block, which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode, which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks, which are not further partitioned, are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or a rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \quad (1)$$

$$mvx = (ux >= 2^{bitDepth-1}) ? (ux - 2^{bitDepth}) : ux \quad (2)$$

$$uy = (mvy + 2^{bitDepth}) \% 2^{bitDepth} \quad (3)$$

$$mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \quad (5)$$

$$mvx = (ux >= 2^{bitDepth-1}) ? (ux - 2^{bitDepth}) : ux \quad (6)$$

$$uy = (mvpy + mvdy + 2^{bitDepth}) \% 2^{bitDepth} \quad (7)$$

$$mvy = (uy >= 2^{bitDepth-1}) ? (uy - 2^{bitDepth}) : uy \quad (8)$$

The operations may be applied during the sum of mvp and mvd, as shown in formula (5) to (8).

Method 2: remove the overflow MSB by clipping the value $$vx = Clip3(-2^{bitDepth-1}, 2^{bitDepth-1}-1, vx)$$

$$vy = Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x & ; \quad z < x \\ y & ; \quad z > y \\ z & ; \quad \text{otherwise} \end{cases}$$

Figure 4:
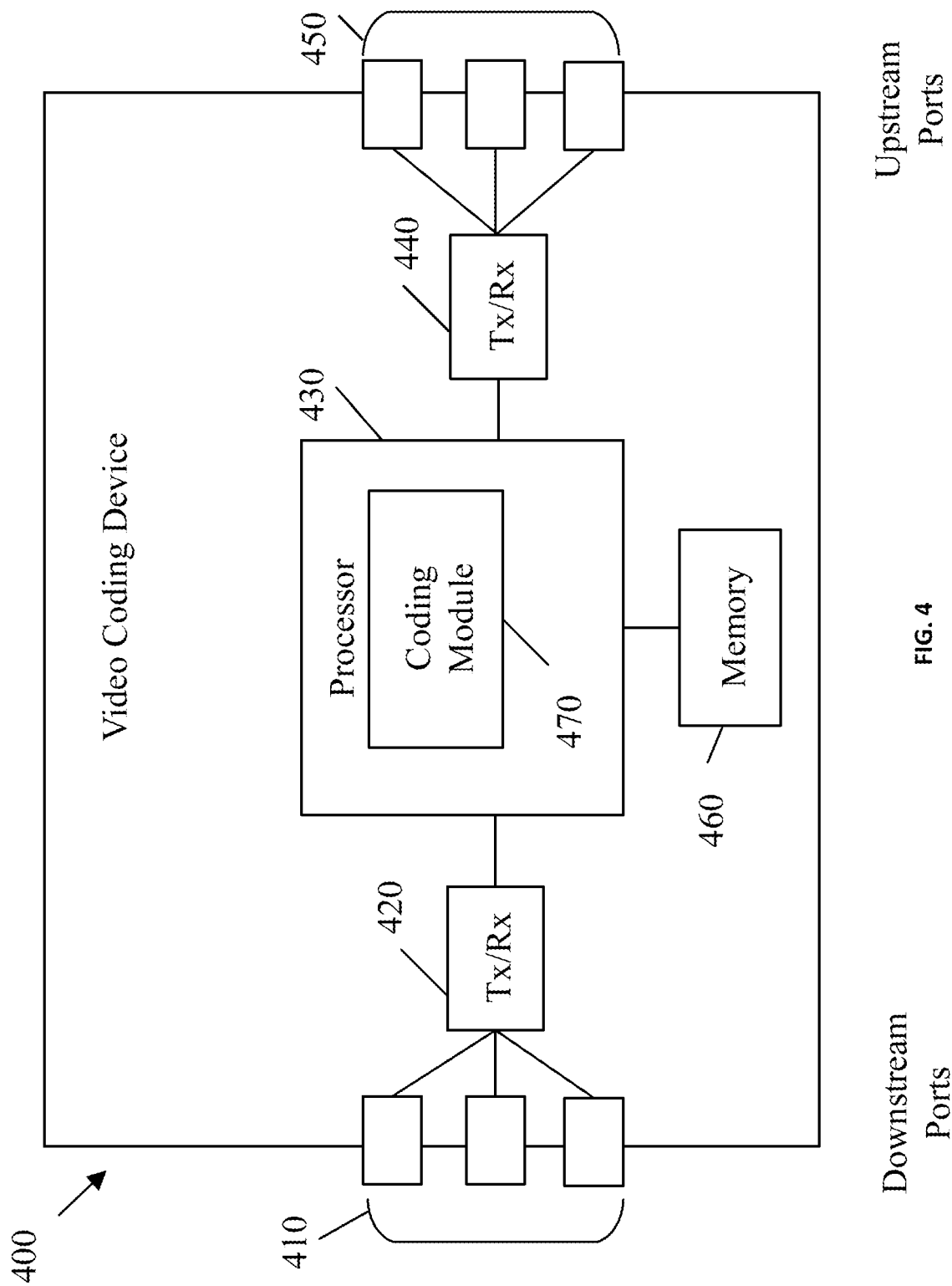
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
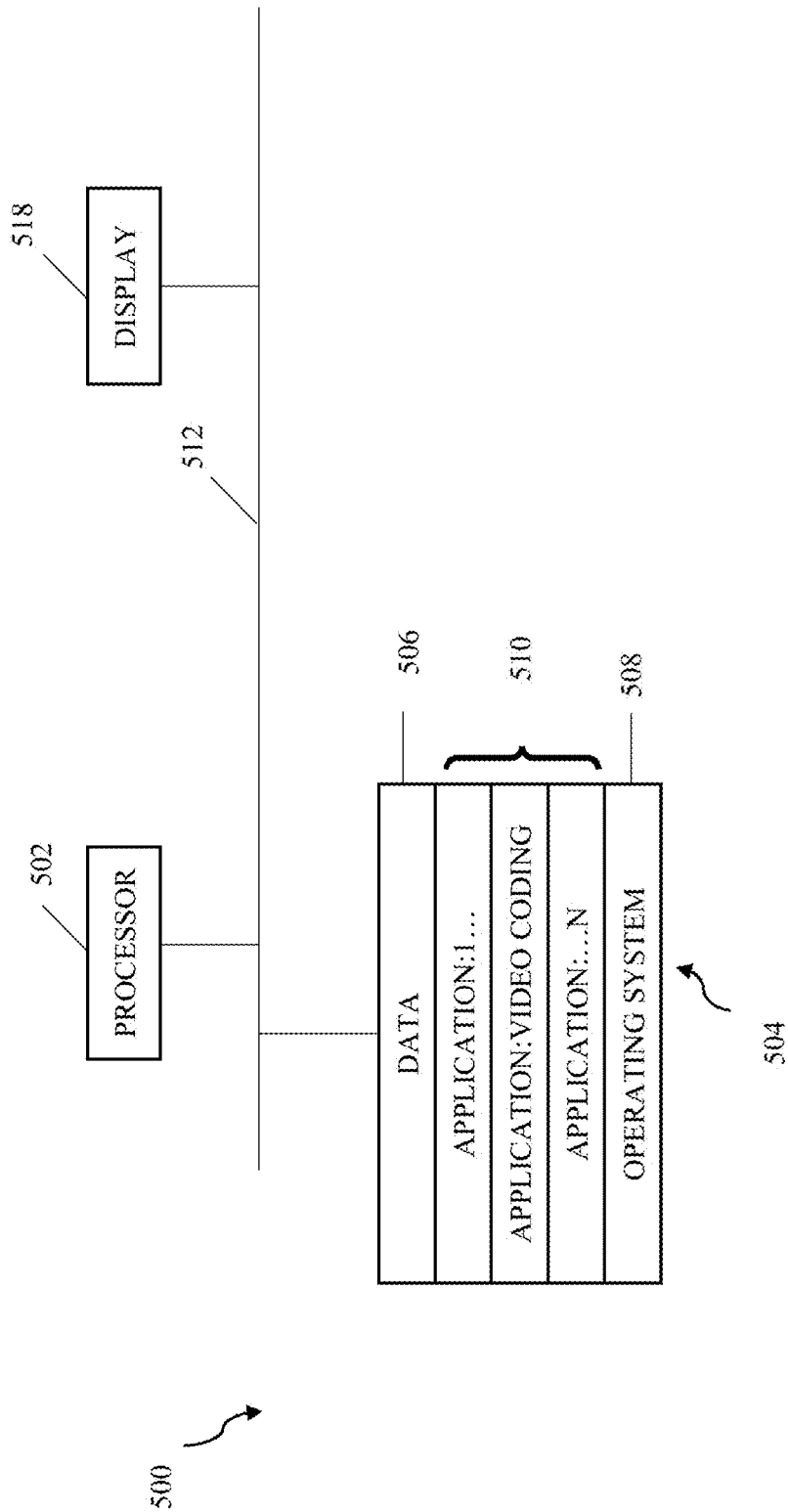
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Local illumination compensation (LIC) is one of the techniques for improving motion compensation. LIC is applied to the results of the motion compensation, or in general to the results of the inter prediction (e.g. performed by an inter-prediction unit 244 of an encoder 20 as shown in FIG. 2 and/or by an inter prediction unit 344 of a decoder 30 as shown in FIG. 3).

LIC comprises adjusting predicted samples by multiplying the predicted samples (respectively the values of the samples) with a first parameter $\alpha$ (respectively with a value of the first parameter $\alpha$) and adding a second parameter $\beta$ (respectively a value of the second parameter $\beta$). The parameters $\alpha$ and $\beta$ are derived from neighboring samples of the current block and the reference block using a least mean squares method. The parameters $\alpha$ and $\beta$ can be derived with a subset or subsets of reference samples, e.g. as shown in FIG. 6.

Figure 6:
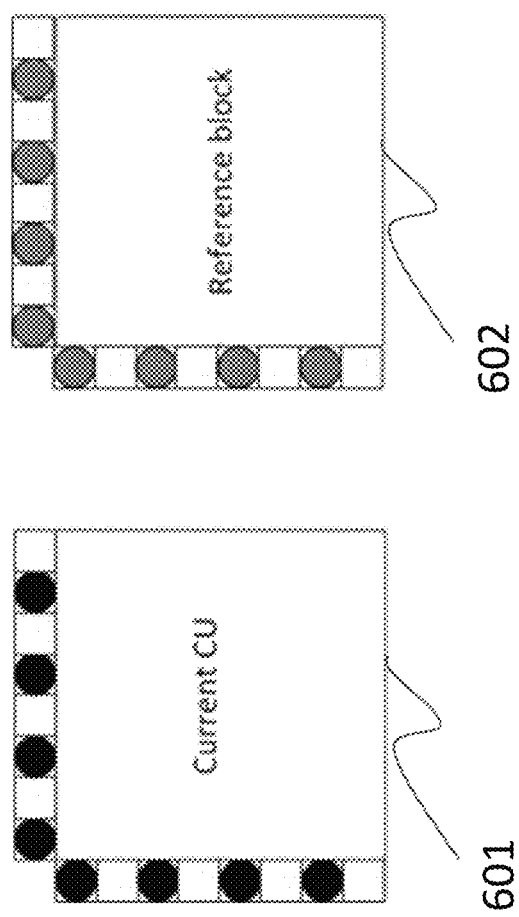
FIG. 6 is an illustration of reference samples used as input data for an illumination compensation method according to an embodiment of the present disclosure.

FIG. 6 shows on the left hand side a current block 601 (e.g. a current CU) and reference samples (such as neighboring samples) as filled black circles. The reference samples, such as neighboring samples are, e.g., samples adjacent to a left border (or boundary) and a top border of the current block and may belong, e.g., to previously reconstructed neighboring blocks of the current block. FIG. 6 shows on the right hand side a reference block, e.g. the reference block used for inter-prediction of the current block, and reference samples (such as neighboring samples) of the reference block as filled grey circles. The reference samples, such as neighboring samples of the reference block may be, e.g. samples adjacent to a left border and a top border of the reference block 602. In a preferably implementation, the neighboring samples of the reference block 602 have the same relative position with regard to the reference block as the neighboring samples of the current block, in other words the (relative) positions of the neighboring samples of the reference block and the current block match.

The neighboring samples of the reference block 602 are, for example, decoded samples (e.g. from a decoded picture 231, 331 stored in the DPB 230, 330, e.g. after in-loop filtering and deblocking) at the positions that are adjacent to a left border and a top border of the reference block 602. The neighboring samples of the current block 601 are, for example, reconstructed samples (e.g. of a reconstructed neighboring block 215, 315, e.g. prior to in-loop filtering and deblocking) at the positions that are adjacent to a left border and a top border of the current block 601.

When a block is coded with merge mode, a LIC flag is copied, e.g. from neighboring blocks of the current block, in a way similar to motion information copy in merge mode; otherwise, an LIC flag is signaled for the block to indicate whether LIC is to be applied or not.

At the encoder side, when LIC is enabled for a block, a mean-removed sum of absolute difference (MR-SAD) and/or a mean-removed sum of absolute Hadamard-transformed difference (MR-SATD) can be used to estimate a distortion, instead of SAD for integer pel motion search and SATD for fractional pel motion search, respectively (e.g. MR-SAD for integer and MR-SATD for fractional pel motion search).

Least mean squared (LMS) error computation may increase the latency value. Specifically, the following formula:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (1)$$

$$\beta = \frac{\sum C(n) - \alpha \cdot \sum L(n)}{N} \quad (2)$$

where N is the number of samples, C(n) are neighboring reconstructed samples of the current block (e.g. top and/or left neighboring samples as shown in FIG. 6) and L(n) is neighboring reconstructed samples of the reference block (e.g. top and/or left neighboring samples as shown in FIG. 6).

In an exemplary implementation, C is a set of neighboring samples of the current block and L is a set of neighboring samples (e.g. top and/or left neighboring samples as shown in FIG. 6) of the reference block (i.e. a block that is used as an input for motion compensation and is referenced by a motion vector).

When deriving parameters α the mean values can be removed from both sets: the set C and set L. In this case, parameter p is further calculated with consideration of the differences between mean values of L and C.

A similar approach is used in Cross-Component Linear Model (CCLM) prediction, but the linear parameters are used not to update the values of the inter-predicted block (e.g. the values of the inter-predicted samples for the current block), but to derive the values of chroma predicted samples from the values of luma predicted samples.

Equations (1) and (2) require a significant amount of operations that result in increased hardware complexity. Besides, the number of summations that can be performed in parallel is limited, and N summands can only be calculated using a minimum of $\lceil \log_2(N) \rceil$ sequential operation steps.

Since LIC is performed directly after motion compensation, the number of sequential steps for the parameter derivation may be critical, because the coding of other intra coded blocks may depend on the current inter coded block (e.g. for Combined Intra Inter Prediction, Adaptive Loop Filter, etc.), in other words the current inter coded block must first be reconstructed before the intra coded blocks can be processed (e.g. decoded), wherein the current block can only be reconstructed from the predicted samples after the parameter derivation is complete.

Embodiments of the present disclosure may be configured to derive parameters α and β using minimum and maximum values within a set of neighboring samples of the reference block, referred to as set L, as well as the corresponding positions of these maximum and minimum values within this set L. A set of neighboring samples of the current block is referred to as set C. In embodiments of the present disclosure, the positions of the neighboring samples in the two neighboring sample sets C and L may match, i.e. may be identical.

In this case, the number of operations can be decreased significantly compared to the LMS method.

Thus, embodiments of the present disclosure provide a simplified derivation of the parameters α and β, and accordingly a simplified LIC.

Embodiments may, for example, comprise the following steps:

obtaining inter-predicted sample values (e.g. for a current block, e.g. a current CU, of the picture) using motion compensation (these inter-predicted sample values may also be referred to as original, intermediate or uncompensated predictor or prediction block sample values, see e.g. reference signs 265, 365 in FIGS. 2 and 3);

obtaining a minimum value $x_A$ (e.g. minimum luma value or minimum reference or neighboring value) and a maximum value $x_B$ (e.g. maximum luma value or maximum reference or neighboring value) from the set of values L derived from the neighboring samples of at least one reference block (e.g. of only one reference block in case of uni-prediction, or of two reference blocks, e.g. in case of bi-prediction, or of even more reference blocks), and corresponding positions A and B, wherein A represents the position of the neighboring sample having the minimum value $x_A$ and B represents the position of the neighboring sample having the maximum value $x_B$ (positions A and B can also be referred to as relative positions as they represent a position of a neighbor sample relative to the position of the respective block, e.g. the current and the reference block);

obtaining the values of neighboring samples of the current block at the obtained positions A and B, referred to as $y_A$ and $y_B$, respectively;

obtaining the values of parameters α and β using the calculated values, e.g. by the following equations:

$$\alpha = \frac{y_B - y_A}{x_B - x_A}$$

$$\beta = y_A \cdot \alpha x_A;$$

and applying the calculated values of parameters α and β to get updated values of the inter-predicted samples, e.g. by the following equation: pred'(x,y)=α·pred(x,y)+β, wherein pred(x,y) represents the original predictor or prediction block samples obtained by the inter prediction, respectively motion compensation and pred'(x,y) represents the updated predictor or prediction block samples (these updated inter-predicted sample values may also be referred to as final or compensated predictor or prediction block sample values, see reference sign 265, 365 in FIGS. 2 and 3, and may be used directly or further processed for the reconstruction to obtain a reconstructed current block 215, 315 of a picture; instead of "updating" one may also refer to as compensating, adapting or modifying in this context).

Parameters α and β can be referred to as updating (or compensation or adaptation) parameters. Other embodiments may use different updating parameters and different processing to update the predictor or prediction block sample values.

In case of uni-directional prediction, the set of values L is composed of the neighboring samples of the one reference block used for inter-prediction.

Figure 7:
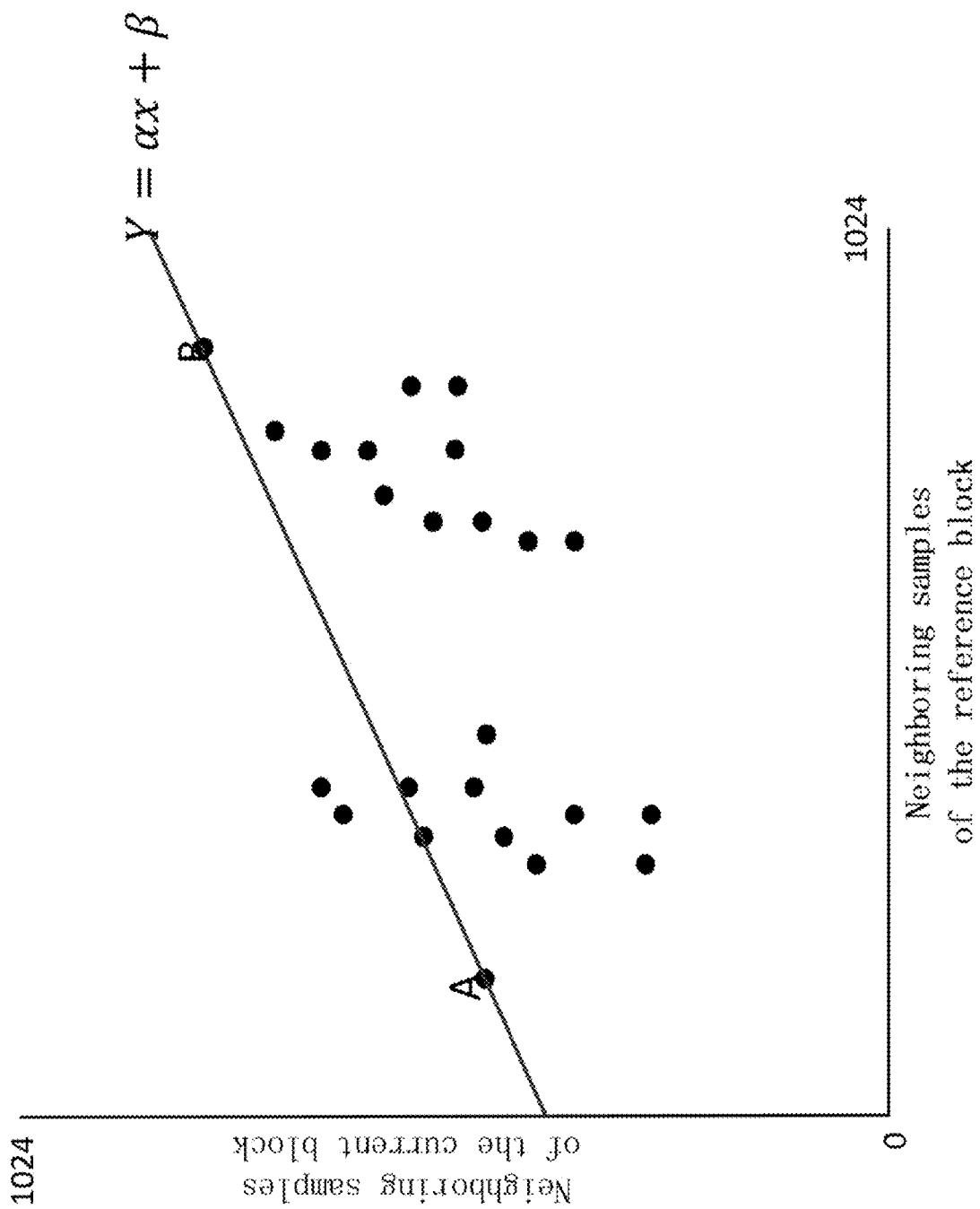
FIG. 7 is an illustration of a derivation of parameters α and β based on neighboring samples according to an embodiment of the present disclosure.

FIG. 7, shows a (x,y) coordinate system (two-dimensional diagram), wherein the sample values of the neighboring samples of the reference block of set L are associated to the x-axis (range of 1024 values) and the sample values of the neighboring samples of the current block of set C are associated to the y-axis (range of 1024 values), A is depicted at position ($x_A$, $y_A$) and B at position ($x_B$, $y_B$), $x_A$ being the minimum sample value of the sample values of the set L and $x_B$ being the maximum sample value of the sample values of the set L.

In the following different embodiments of the present disclosure are described.

One aspect of the embodiments is the way for calculating or determining positions A and B.

In an embodiment, positions A and B correspond to the positions of the minimum and maximum sample value within the set L. When the set L has a subset of several reference samples of the reference block, wherein each of these samples are equal to each other and are smaller than other reference samples (e.g. smaller than all other reference samples) belonging to L, position A is selected for the reference sample belonging to the subset and having the maximum distance to the top-left corner of the reference block. Similarly, when set L has a subset of several reference samples, wherein each of these samples are equal to each other and are larger than other reference samples (e.g. larger than all other reference samples) belonging to L, position B is selected for the reference sample belonging to the subset and having the maximum distance to the top-left corner of the reference block.

Figure 8:
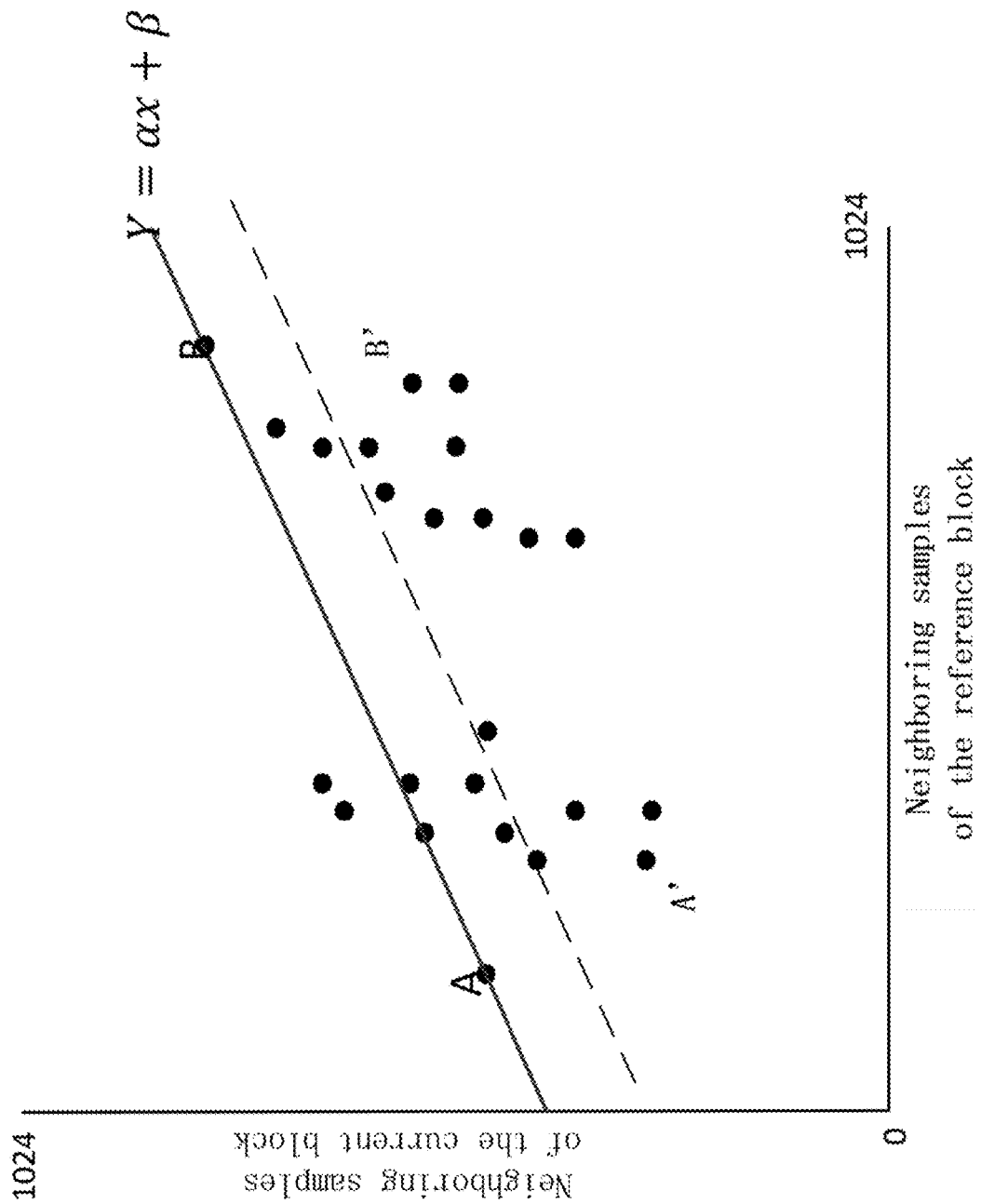
FIG. 8 is an illustration of a derivation of parameters α and β based on neighboring samples according to an embodiment of the present disclosure that uses the two largest and the two smallest values of the neighbor samples of the reference block.

In another embodiment, not only the smallest luma value or sample value A and largest luma value or sample value B are searched (or determined) but also the second-smallest luma value or sample value A' and the second-largest luma value or sample value B' are searched (or determined), as shown in FIG. 8. The parameters α and β are derived using an averaged line, i.e. a linear model illustrated by a dashed line in FIG. 8. In this embodiment, positions A and B may be also substituted by one of the following variants:

Variant1:
($x_A$+$x_{A'}$+1)>>1, the averaged value of the smallest sample value A and the second-smallest sample value A' (namely the first averaged value) is used instead of $x_A$;
($x_B$+$x_{B'}$+1)>>1, the averaged value of the largest sample value B and the second-largest sample value B' (namely the second averaged value) is used instead of $x_B$;
($y_A$+$y_{A'}$+1)>>1, the sample value of the current block at the corresponding position having the first averaged value is used instead of $y_A$; ($y_B$+$y_{B'}$+1)>>1, the sample value of the current block at the corresponding position having the second averaged value is used instead of $y_{B'}$ Variant2:
($x_A$+$x_{A'}$)>>1, the averaged value of the smallest sample value A and the second-smallest sample value A' (namely the first averaged value) is used instead of $x_A$;
($x_B$+$x_{B'}$)>>1, the averaged value of the largest sample value B and the second-largest sample value B' (namely the second averaged value) is used instead of $x_B$;
($y_A$+$y_{A'}$)>>1, the sample value of the current block at the corresponding position having the first averaged value is used instead of $y_A$; ($y_B$+$y_{B'}$)>>1, the sample value of the current block at the corresponding position having the second averaged value is used instead of $y_{B'}$.

In another embodiment a division operation $$\alpha = \frac{y_B - y_A}{x_B - x_A}$$

is implemented using a multiplication and a fetch from a look-up table (LUT). This substitution is possible, for example, by using the following method:

$$\frac{v_0}{v_1} \approx v_0 \cdot LUT[v_1] >> S,$$

where S is a shift parameter that specifies the precision. Hence, a 64-entries look-up table could be specified, e.g. as follows (such as k=0 . . . 63):

$$LUT[k] = \frac{2^{15} + (k >> 1)}{k}.$$

The division operation in the equation above may be an integer division as, for example, used in C programming language.

Parameter $$\alpha = \frac{y_B - y_A}{x_B - x_A}$$

may be calculated using multiplication and fetch as follows:

$$\alpha = ((y_B - y_A) \cdot m + (1 << (S-1))) >> S,$$

where S is a shift that depends on the precision of the look-up table and m=LUT[($y_B$−$y_A$)>>$N_s$], where $N_s$ is a difference subsampling factor. In this particular embodiment, S=15 and $N_s$=10−6=4 (since a LUT has $2^6$ entries and the input difference $x_B$−$x_A$ is a 10-bit value).

In such embodiments LUT entries are mapped linearly to the values of the luminance difference ($y_B$−$y_A$).

In another embodiment, a non-linear LUT mapping may be used. An exemplary 64-entries LUT is given in Table 1.

TABLE 1

Exemplary LUT with non-linear mapping

| | Col | | | | | | |
|---|---|---|---|---|---|---|---|
| lut_shift | 0 | 1 | 2 | 3 | 4 | 5 | 6 | 7 |
| −1 | 128 | 128 | 171 | 128 | 205 | 171 | 146 | 128 |
| 0 | 228 | 205 | 186 | 171 | 158 | 146 | 137 | 128 |
| 1 | 241 | 216 | 195 | 178 | 164 | 152 | 141 | 132 |
| 2 | 248 | 221 | 200 | 182 | 167 | 155 | 144 | 134 |
| 3 | 252 | 224 | 202 | 184 | 169 | 156 | 145 | 135 |
| 4 | 254 | 226 | 204 | 185 | 170 | 157 | 146 | 136 |

In this embodiment, the value of multiplier is restored from the value fetched from the LUT as follows:

$$m = LUT[idx] << m_s$$

where $m_s$=6−($lut_{shift}$+1)+δ. The value of δ is set equal to 3, 2, 1, 1, respectively for "idx" values less or equal to 4.

The index value "idx" is a raster index in Table 1 and can be calculated as max(lut_shift,0)·8+col.

The value of "lut_shift" is a position of the most significant bit in the input difference $x_B-x_A$, and the value of "col" is the next three bits following the most significant one.

In another embodiment, the LUT tabulates the values of significands. Specifically, DivSigTable [ ]={0, 7, 6, 5, 5, 4, 4, 3, 3, 2, 2, 1, 1, 1, 1, 0}

A 4-bit significand is always more than or equal to 8 because it expresses the four most significant bits. The table therefore omits the MSB bit and each element needs only 3 bits. The total size of the table is 3*16=48 bits.

The following steps are performed to get the value of a a difference is calculated as follows: $\Delta = \lfloor \log_2(\Delta_x) \rfloor$, $\Delta_x = x_B - x_A$;

a normalization is performed as follows: $\Delta_{norm}= [(\Delta_x<<4)>>\Delta] \& 15$;

if $\Delta_{norm} \neq 0$, increment $\Delta$ by 1.

$\gamma = \lfloor \log_2(|\Delta_y|) \rfloor + 1, \Delta = y_B - y_A$ parameter $\alpha$ is obtained as follows: $\alpha=(\Delta_y(\text{DivSigTable}[\Delta_{norm}]+8)+2^{\gamma-1})>>\gamma$ The value of parameter $\alpha$ can have a different precision depending on the values of the differences. Hence, the calculation of parameter $\beta$ may be adopted to consider this fact. Specifically, $\beta = y_A - ((\alpha x_A) >> k)$, where k=max(1, 3+Δ−γ).

Figure 9:
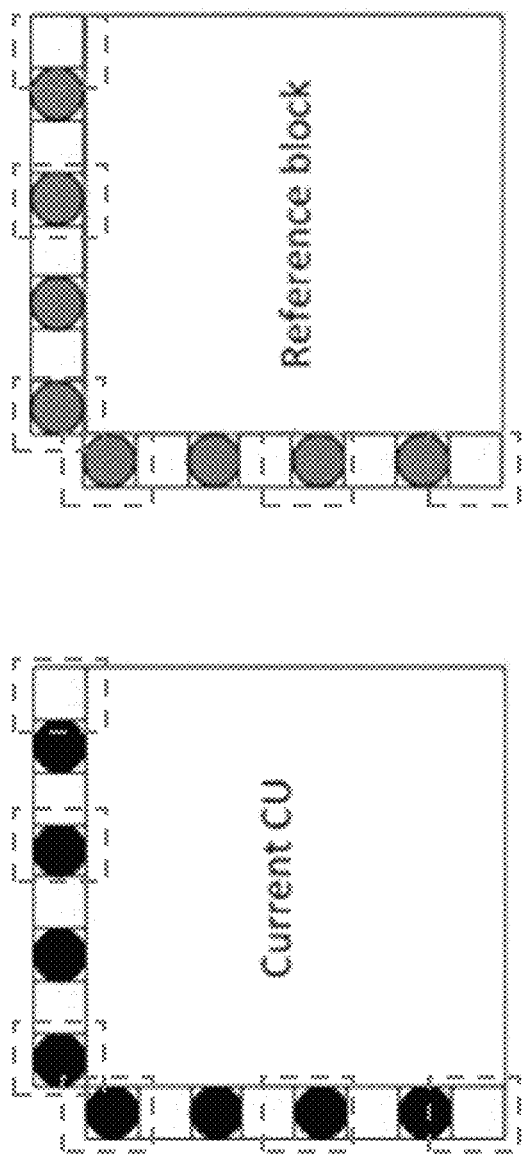
FIG. 9 is an illustration of three neighboring samples of the top and the left side of the blocks used to fill in two sets L and C according to an embodiment of the present disclosure.

In another embodiment, sets L and C are composed of or comprise the neighboring samples that are adjacent to the corner and the middle of the reference and current block (FIG. 9). The rest of the neighboring samples are skipped and not taken into account. Given a length of the side S, allowed positions (i.e. positions of the neighboring samples that will be included to L and C) of the neighboring samples along the side are defined as 0, S>>1 and S−1, wherein S>>1 means S right-shift by 1.

In another embodiment (FIG. 10), only those neighboring samples are included into sets L and C, which have a distance to the top-left corner exceeding a threshold T. The threshold T can, for example, be defined to be equal to one of the following:
a half of the block side length S;
a quarter of the block side length S;
a fixed value, comprising one of the following: 2, 4, 6 or 8 samples; wherein the block side length, is such as the width or height of the block.

Figure 10:
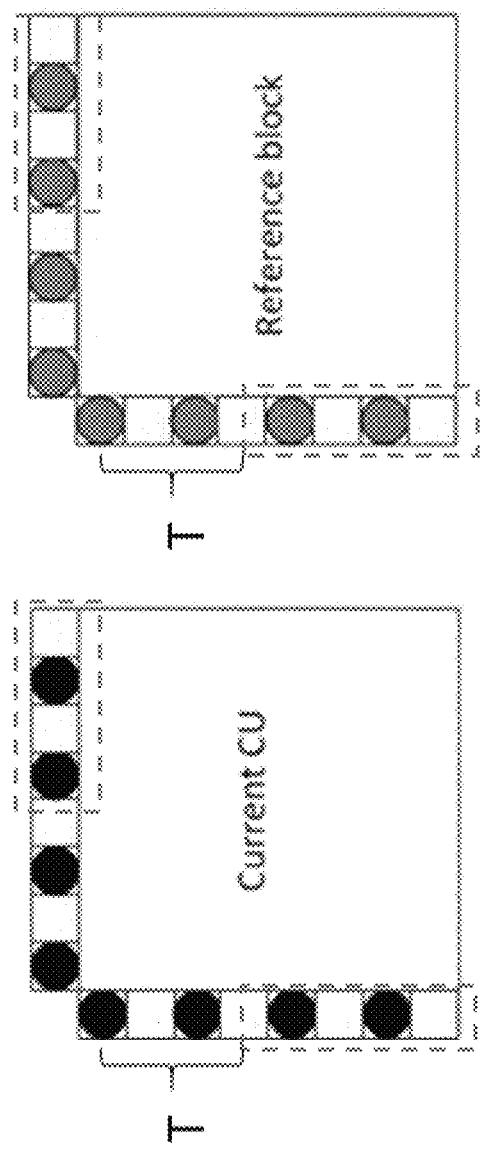
FIG. 10 is an illustration of a distance constraining a filling of the two sets L and C according to an embodiment of the present disclosure.

In FIG. 9 and FIG. 10, rectangles with dashed lines encompass the allowed positions of neighboring samples.

For the case of several reference blocks, predictor pred (x,y) can be obtained as a result of motion compensation applied to these reference blocks. Particularly, for the case of bi-prediction, pred(x,y) may be a linear combination of two reference blocks.

In this case, a set of reference or neighboring samples L is obtained using linear combination of reference samples of the reference blocks, wherein a value in the set L is obtained as a weighted sum of two or more neighboring samples, that are adjacent to different reference blocks (e.g. to the two reference blocks in case of bi-prediction) but have the same positions relative to these reference blocks.

Figure 11:
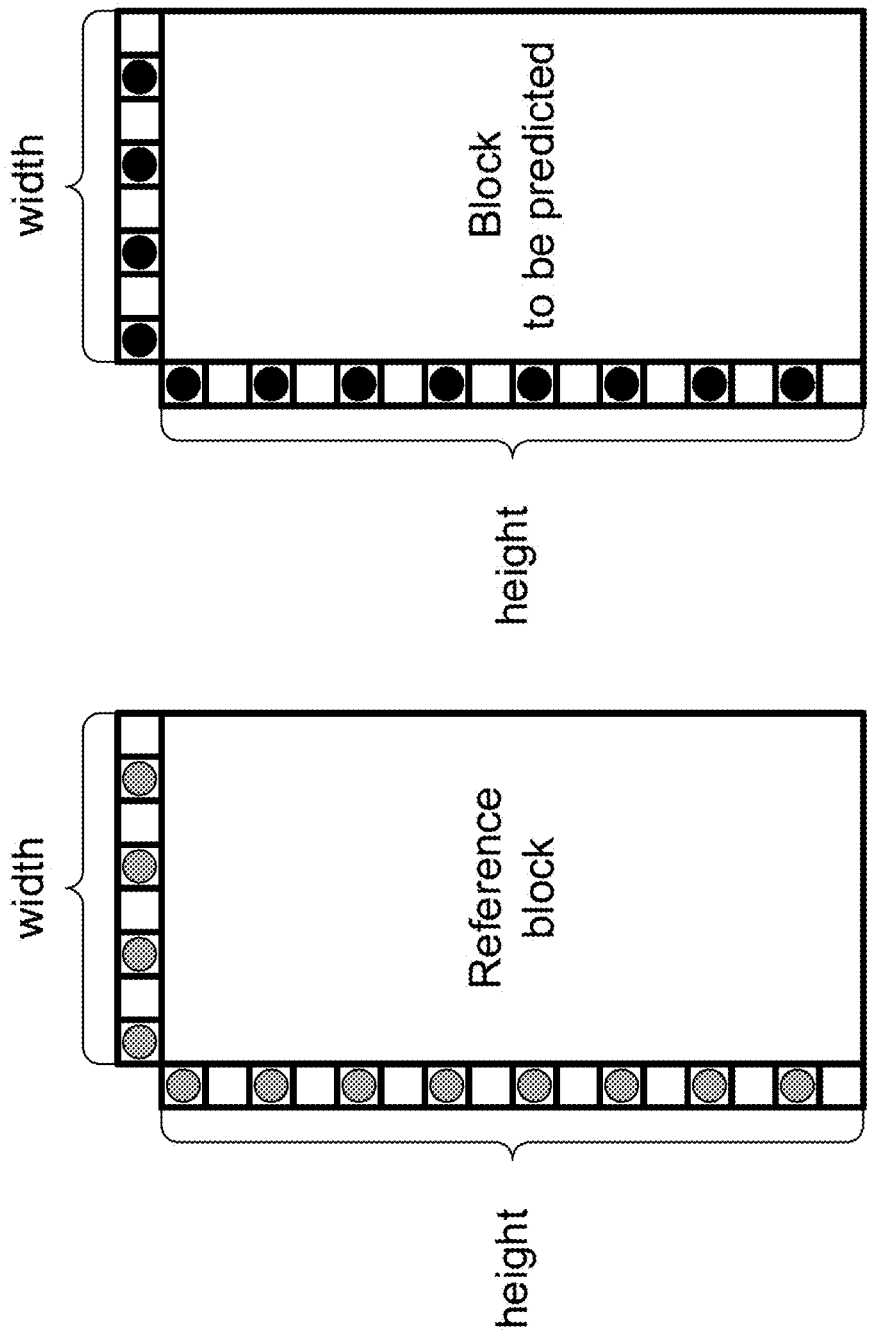
FIG. 11 is an illustration of a rectangular block with the top and the left sides of adjacent samples that are used as templates after downsampling according to an embodiment of the present disclosure.
Figure 12:
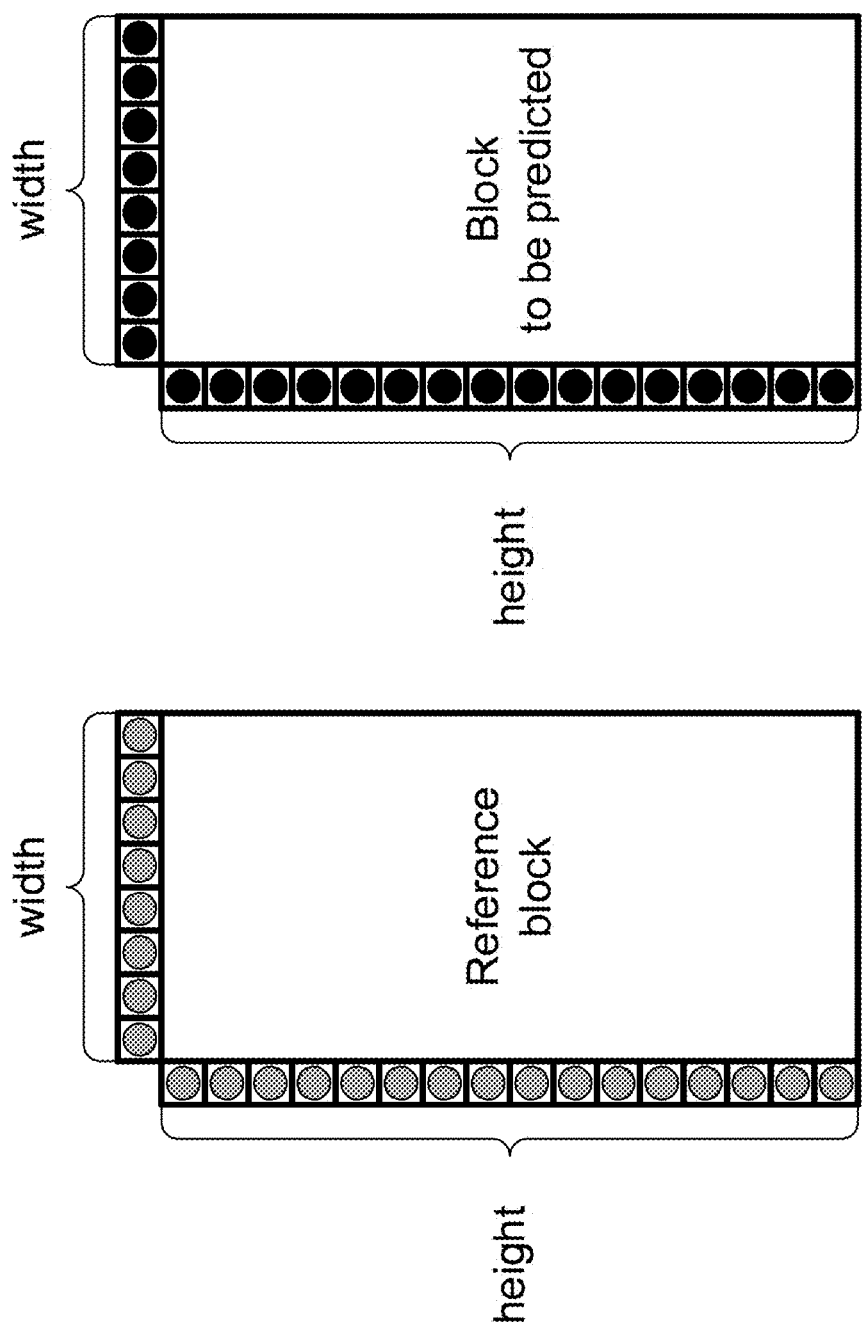
FIG. 12 is an illustration of a rectangular block with the top and the left sides of adjacent samples that are used as templates without downsampling according to an embodiment of the present disclosure.

To calculate p with higher accuracy, mean values of LIC templates for both the current and reference blocks can be computed. The LIC templates are an L-shaped area to the left and top of the block. As shown in FIGS. 11 and 12, template samples can be either downsampled (FIG. 11) or not (FIG. 12) before applying the above-described procedure of calculating $\alpha$ and $\beta$ as well as calculating the mean values to the template samples (such as left template samples or top template samples). In addition, to remove and to reduce impact of outliers, template samples can be filtered using different (linear or non-linear) smoothing filters. In particular, FIR (Finite Impulse Response) filters with coefficients of [1, 2, 1]/4 and [1, 0, 2, 0, 1]/4 can be used for this purpose. These filters can be applied interchangeably (either one or another) to template samples. In particular, filter with coefficients of [1, 2, 1]/4 is applied if the number of samples in a block is equal to or less than 256, i.e. width*height<=256. Otherwise (applied if the number of samples in a block is greater than 256, i.e. width*height>256), [1, 0, 2, 0, 1]/4 is used. Other FIR filters can also be applied to template samples.

Figure 13:
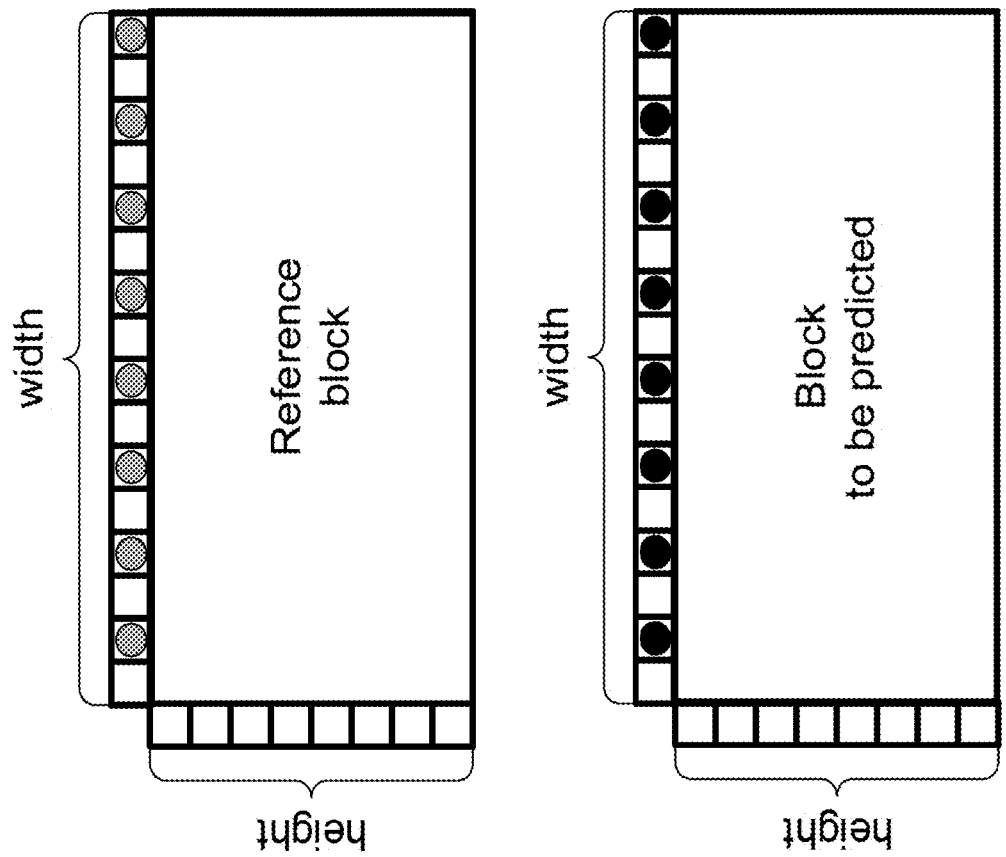
FIG. 13 is an illustration of a horizontally oriented rectangular block where the top side of adjacent samples is used to calculate mean values according to an embodiment of the present disclosure.
Figure 14:
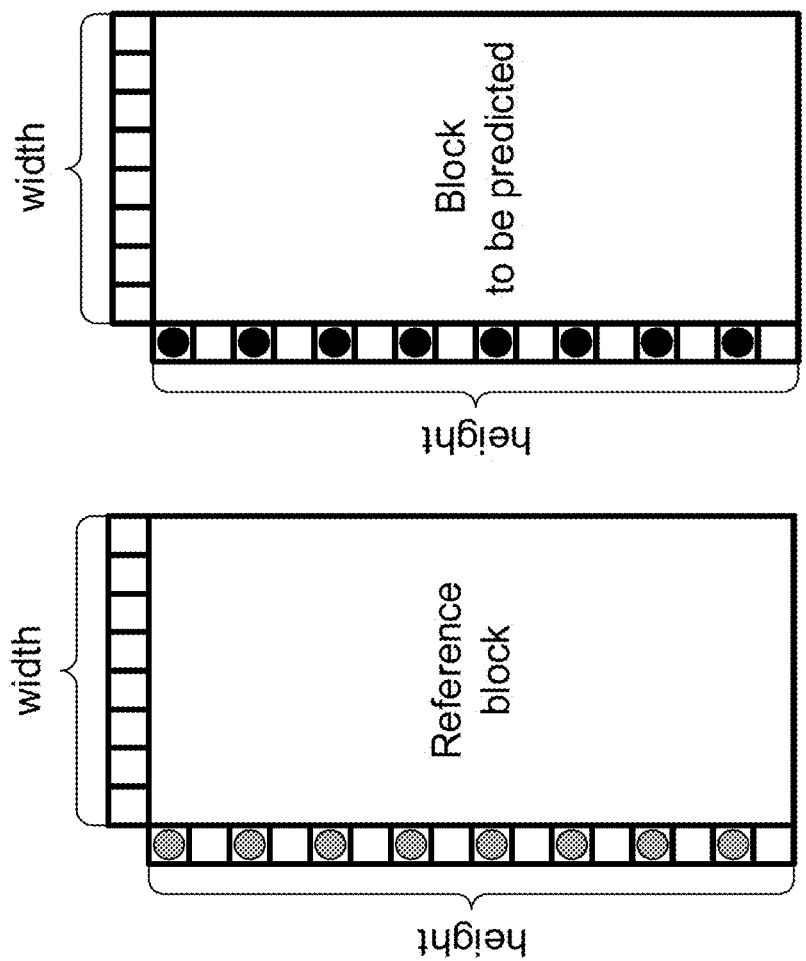
FIG. 14 is an illustration of a vertically oriented rectangular block where the left side of adjacent samples is used to calculate mean values according to an embodiment of the present disclosure.
Figure 15:
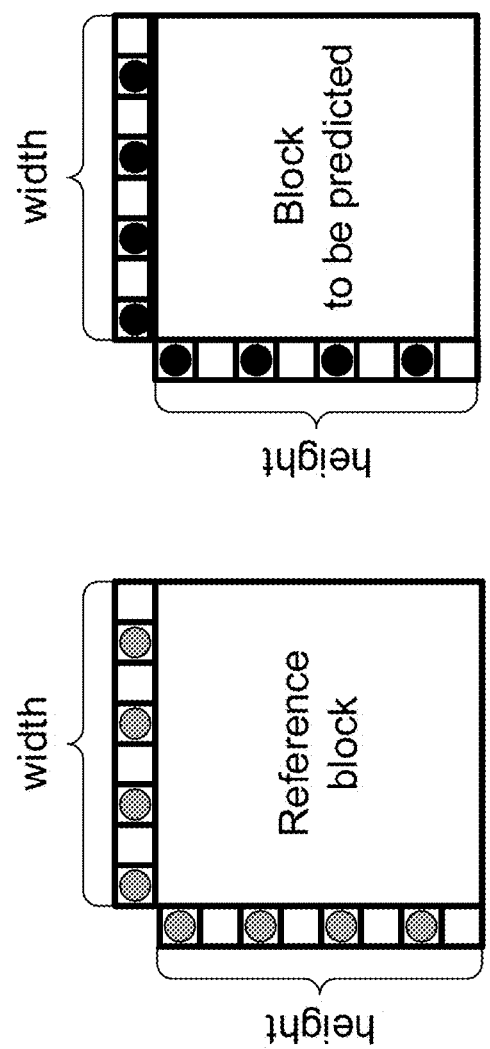
FIG. 15 is an illustration of a square block where both the top and the left sides of adjacent samples are used to calculate mean values according to an embodiment of the present disclosure.

To calculate mean values of template samples without using a division operation, the following formulas can be used:

$$\text{Mean} = \frac{\left(\sum_{i=0}^{W+H-1} p_i\right) + ((W+H) \gg 1)}{W+H} \approx \frac{\left(\sum_{i=0}^{W-1} p_i\right) + (W \gg 1)}{W} = \left(\left(\sum_{i=0}^{W-1} p_i\right) + (W \gg 1)\right) \gg w \quad (3)$$

if W>H (cf. FIG. 13) and $$\text{Mean} = \frac{\left(\sum_{i=0}^{W+H-1} p_i\right) + ((W+H) \gg 1)}{W+H} \approx \frac{\left(\sum_{i=0}^{H-1} p_i\right) + (H \gg 1)}{H} = \left(\left(\sum_{i=0}^{H-1} p_i\right) + (H \gg 1)\right) \gg h \quad (4)$$

if H>W (cf. FIG. 14)

$$\text{Mean} = \frac{\left(\sum_{i=0}^{W+H-1} p_i\right) + (W+H)}{W+H} = \frac{\left(\sum_{i=0}^{W+H-1} p_i\right) + (W \ll 1)}{2W} = \left(\left(\sum_{i=0}^{W+H-1} p_i\right) + (W \ll 1)\right) \gg (w+1) \quad (5)$$

if H=W (cf. FIG. 15), wherein W indicates a top template sample range, H indicates a left template sample range, and W and H are positive integer. Pi indicates the template sample value of the current block or the reference block.

The mean values of $\text{Mean}_{CUR}$ and $\text{Mean}_{REF}$ calculated for the current block (to be predicted) and reference blocks, respectively, should be substituted into the following formula to compute $\beta$:

$\theta = \text{Mean}_{CUR} - \alpha \cdot \text{Mean}_{REF}$.

It is worth noting that implementation of linear model parameter derivation for CCLM and implementation of updating parameter derivation for LIC should be unified with each other, i.e. the same procedure is used both in CCLM and in LIC.

Figure 16:
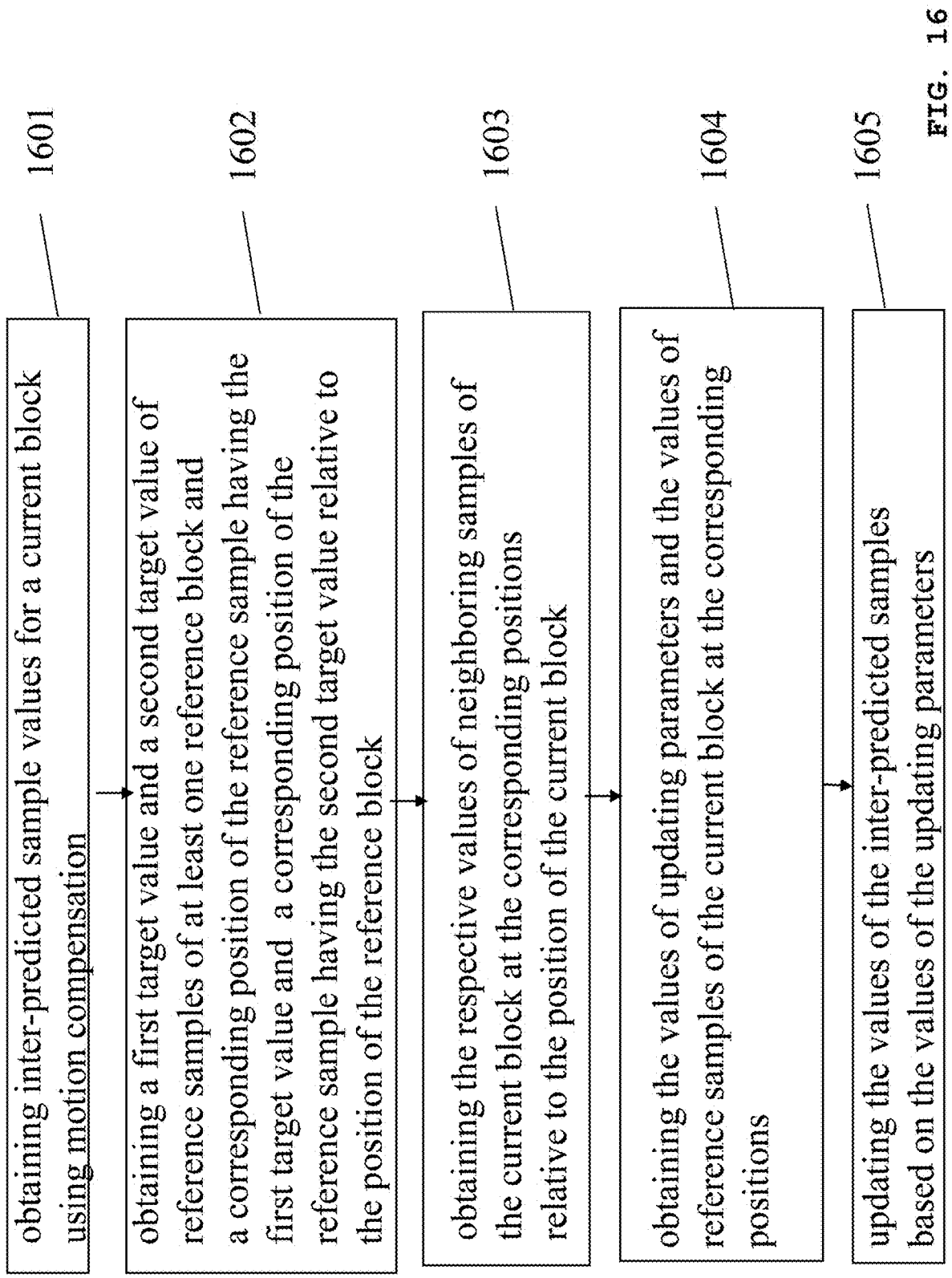
FIG. 16 is a drawing illustrating a method according to an exemplary embodiment of the disclosure.

As shown in FIG. 16, the method for illumination compensation for inter prediction coding (encoding and/or decoding) of a picture according to an embodiment of the disclosure is described as follows.

At the block 1601, obtaining inter-predicted sample values for a current block using motion compensation;

At the block 1602, obtaining a first target value ($x_A$) and a second target value ($x_B$) of reference samples (such as neighboring samples) of at least one reference block and a corresponding position A of the reference sample having the first target value and a corresponding position B of the reference sample having the second target value relative to the position of the reference block; in particular, obtaining a minimum value ($x_A$) and a maximum value ($x_B$) of neighboring samples of at least one reference block and a corresponding position A of the neighboring sample having the minimum value and a corresponding position B of the neighboring sample having the maximum value relative to the position of the reference block (such as, the left corner of the reference block);

At the block 1603, obtaining the respective values of neighboring samples ($y_A$, $y_B$) of the current block at the corresponding positions A and B relative to the position of the current block;

At the block 1604, obtaining or deriving the values of updating parameters (such as α and β) based on the values of reference samples, wherein the values of reference samples comprises one or more of the first target value ($x_A$) and the second target value ($x_B$) of the reference sample of the reference block, and the values of reference samples ($y_A$, $y_B$) of the current block at the corresponding positions A and B; in particular, obtaining linear model coefficients (e.g. the values of updating parameters α and β) using the values of reference samples, wherein the values of reference samples comprises the minimum value ($x_A$) and the maximum value ($x_B$) of the neighboring sample of the reference block, and the values of neighboring samples ($y_A$, $y_B$) of the current block at the corresponding positions A and B; and At the block 1605, updating the values of the inter-predicted samples based on the values of the updating parameters (such as α and β).

To sum up, this present disclosure proposes to use CCLM MinMax method to derive linear model parameters for LIC. It is also proposed to improve performance of both LIC and CCLM by introducing average values computation. It is reported the proposed method reduce the number of sequential computations, simplifies VVC specification draft and reduces hardware complexity.

This present disclosure suggests using unified mechanism of CCLM parameters derivation in LIC and CCLM. Specifically, it is proposed to derive parameters a and b for LIC using the same derivation process as CCLM does, and to increase the accuracy of parameter b.

There are several aspects that are tested in this present disclosure:

1. Template downsampling: Since the MinMax method does not require that the number of processed template samples would be a power of 2, it can be skipped in both cases (i.e. for current and reference blocks).
2. Template filtering: filtering can be applied to template to remove outliers (2 FIR smoothing filters are being tested: [1, 2, 1]/4 and [1, 0, 2, 0, 1]/4 as well as its combination when they are switched subject to block size).
3. Mean values: mean values $y_{mean}$ and $x_{mean}$ can be calculated in several ways:
   a. Like done for DC intra-prediction mode, i.e. either the longer side of the block (when block has rectangular shape) or both sides (when a block is square) are used to computed DC value.
   b. Averaging is performed separately for each side and both results are averaged with each other.

TABLE 2

Summary of the proposed tests or methods

| Test # | Description |
|---|---|
| 1 | Mean values as in DC intra-prediction mode |
| 2 | Test #1 with [1 2 1] applied to reconstructed and reference samples |
| 3 | Test #1 applied in CCLM method |

Illumination compensation is a linear transform that is applied to the samples of the predicted block. In the descriptions above parameter derivation was performed on the basis of availability of the reconstructed samples on the top side or on the left side of the predicted samples.

Figure 17:
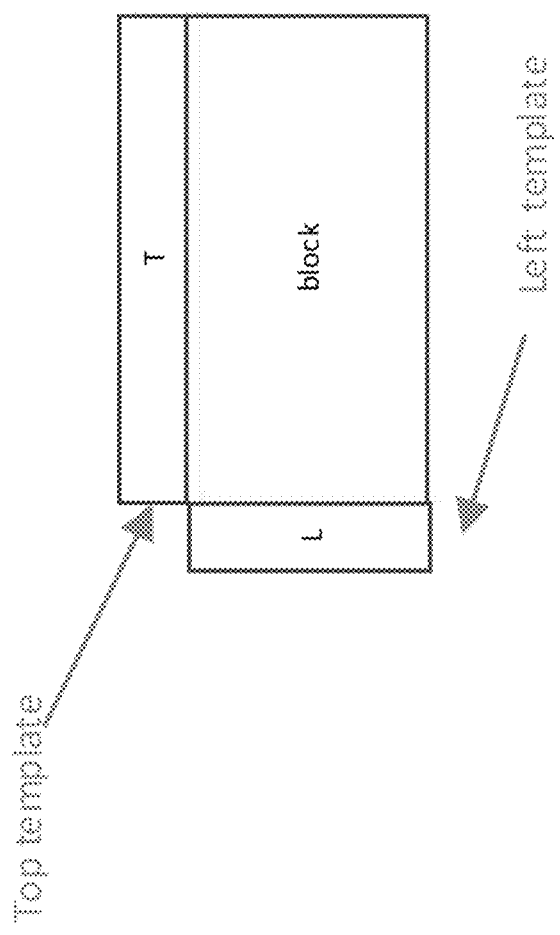
FIG. 17 is an illustration of the top and the left template of the reference or current block according to an embodiment of the present disclosure.

FIG. 17 shows a block with a corresponding left template and a corresponding top template.

Figure 18:
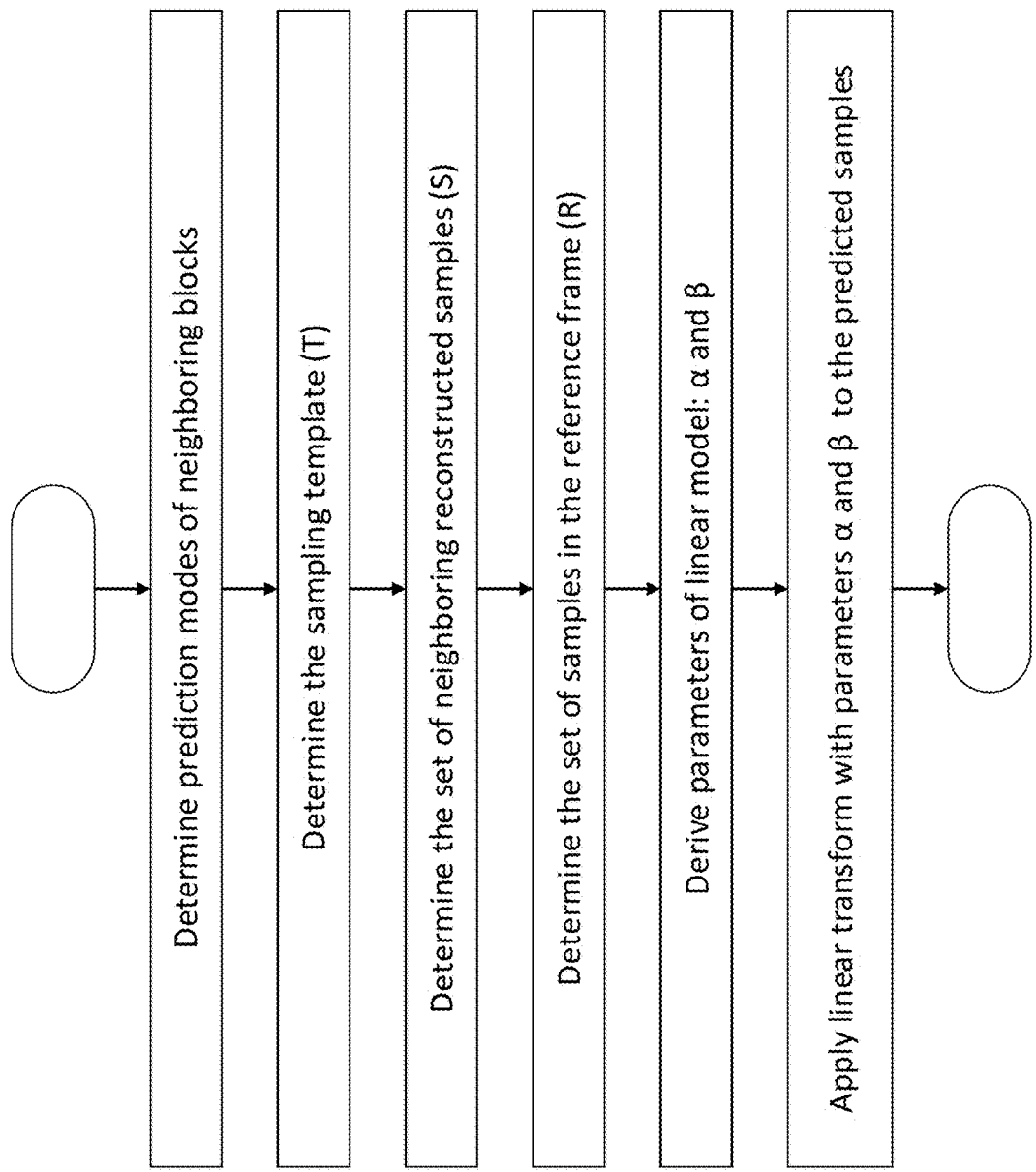
FIG. 18 shows the steps of the proposed method of local illumination compensation that considers prediction modes of neighboring blocks when deriving parameters of illumination compensation.

One embodiment of the present disclosure includes the following steps (shown in FIG. 18):

determining prediction modes for blocks neighboring to left and top side of predicted block;

determine the sampling template (T) on the basis of the determined prediction modes of blocks neighboring to left and top side of predicted block;

determining a set of reconstructed samples (S) that are neighboring to the left side or to the top side of the predicted block and that have a position relative to the predicted block that is permitted by the sampling template T;

determining a set of reference samples (R) that are neighboring to the left side or to the top side of the reference area and that have a position relative to the reference area that is permitted by the sampling template T;

deriving parameters of linear model using samples of the set of reference samples R as reference values and reconstructed samples of the set of reconstructed samples S as target values; and applying linear transform to the samples of the predicted block, wherein parameters of linear transform are the derived parameters of linear model.

Figure 19:
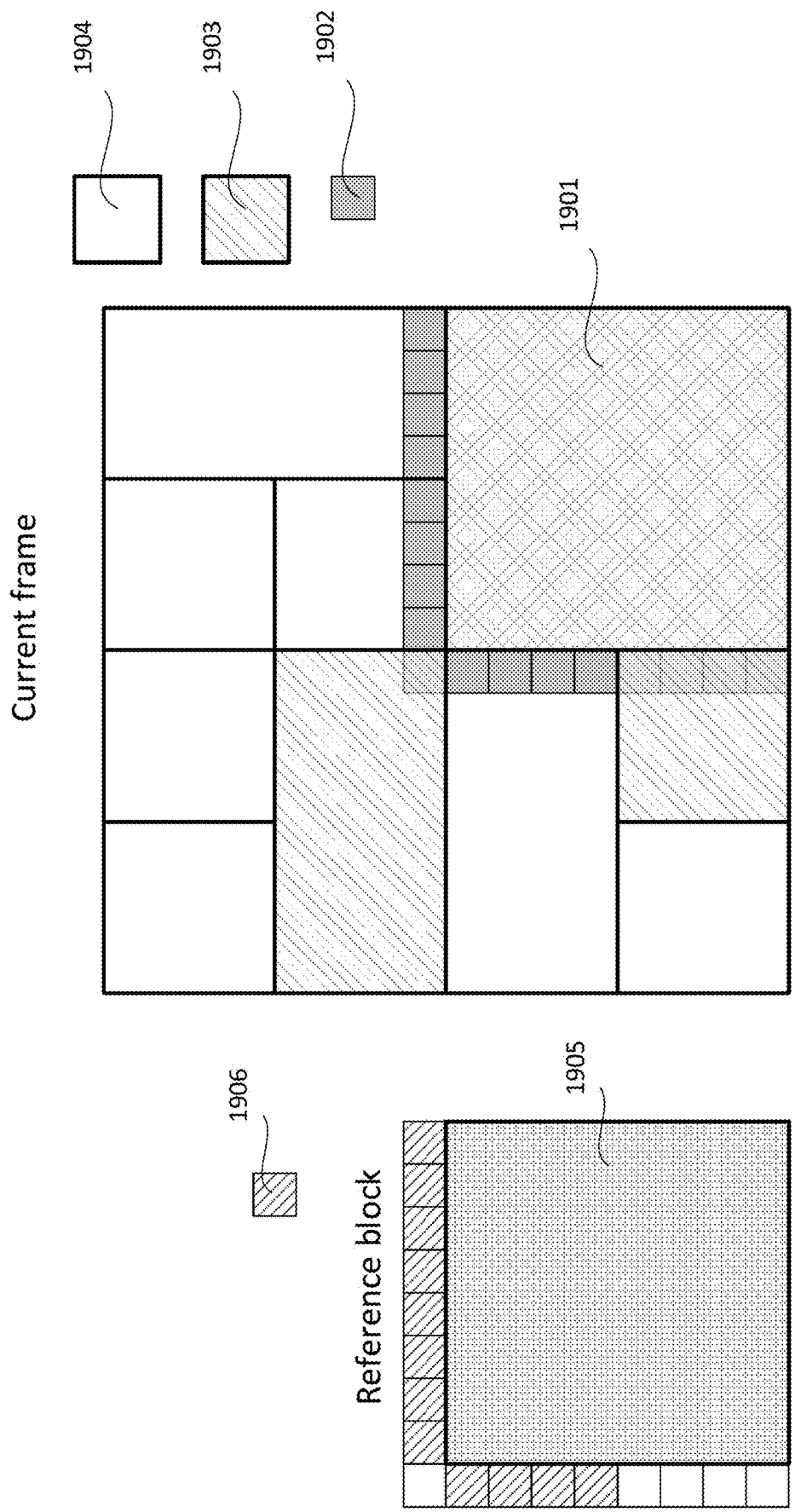
FIG. 19 shows an example of selection of the neighboring reconstructed samples for derivation of linear model parameters that considers prediction modes of neighboring blocks.

Determining of the sampling template (T) based on the determined prediction modes of blocks neighboring to left and top side of predicted block is illustrated in FIG. 19.

In accordance with the coding order, predicted block 1901 of the current frame has a neighboring available reconstructed samples 1902. Reconstructed samples 1902 are obtained as a result of reconstruction process performed for neighboring blocks 1903 and 1904 (215 in FIGS. 2 and 315 in FIG. 3). Reconstructed blocks are obtained from the prediction blocks (265 and 365 in FIG. 2 and FIG. 3, respectively) that may be obtained using different prediction modes, i.e. are the result of inter prediction (244, 344), intra prediction (254, 354) or other prediction process.

Considerations of computational complexity makes inter prediction modes of the neighboring reconstructed blocks to be more desirable, since they may become available for the prediction of the current block earlier than the neighboring blocks of intra prediction mode.

Based on the prediction modes, neighboring reconstructed block are classified into available neighboring blocks 1904 and unavailable neighboring blocks 1903. Exemplary classifier may be as follows:
if prediction mode of a block is INTER, the block is available,
otherwise, the block is unavailable.

INTER prediction mode comprises the prediction modes that do not require neighboring samples of the current frame. Thus, blocks predicted using combined intra-inter prediction (CIIP), intra block copy (IBC) or current picture referencing (CPR) mechanisms are not considered as blocks with INTER prediction modes. Exceptionally, if local illumination compensation (LIC) is applied to the neighboring block it is considered as INTER predicted, despite of the fact it uses neighboring reference samples.

Sampling template T defines a set of spatial positions relative to the predicted block, such that samples in these positions are considered in the further step of parameter derivation. Hence, if position of a neighboring sample is located within available neighboring reconstructed block 1904 it is included into the template T. Otherwise, if a neighboring sample belong to an unavailable reconstructed block, position of this sample is not included into the sampling template T.

The set of neighboring reconstructed samples S is determined on the basis of the sampling template T by including into this set all the neighboring samples 1902 having positions that are included into the sampling template T.

Similarly, the set of reference samples R is determined based on the sampling template T relative to the reference area 1905 by including into this set all the samples of the reference frame that have relative positions included into the sampling template T. In the left part of FIG. 19, exemplary reference samples of the set R 1906 are shown as squares with hatching.

The sets of samples S and R are used to derive parameters of linear model $\alpha$ and $\beta$ as described above, e.g., using a min/max method. In comparison with MSE-minimization methods, the min-max method does not have strong requirement that the number of input samples is equal to the power of 2. Hence, the above-described min-max method for the step of deriving parameters of linear model $\alpha$ and $\beta$ is more desirable than methods based on mean squared error minimization.

The last step is to apply a linear transform to the predicted samples in order to obtain the updated values of predicted samples that are compensated in terms of local illumination. Essentially, linear transform with parameters of linear model $\alpha$ and $\beta$ is the following operation:

$$\text{predSamples}'[x][y] = \alpha \text{predSamples}[x][y] + \beta$$

Parameters $\alpha$ and $\beta$ may be represented as fixed-point integer values a and b with N-bits precision and in this case, this operation would be expressed differently:

$$\text{predSamples}'[x][y] = (\alpha * \text{predSamples}[x][y] + b + (N >> 1)) >> \log_2(N)$$

Figure 20:
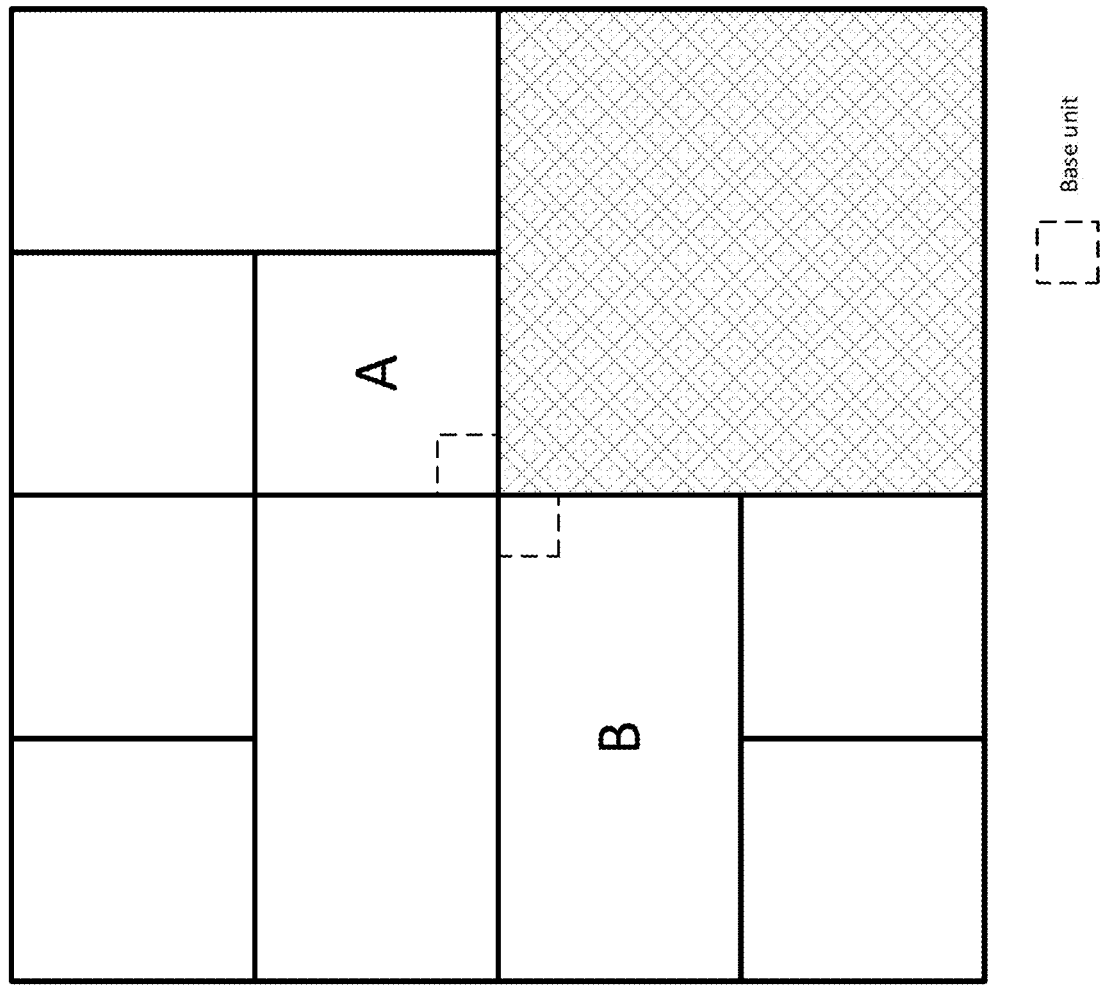
FIG. 20 shows an example of neighboring block prediction mode check for flag signaling process.
Figure 21:
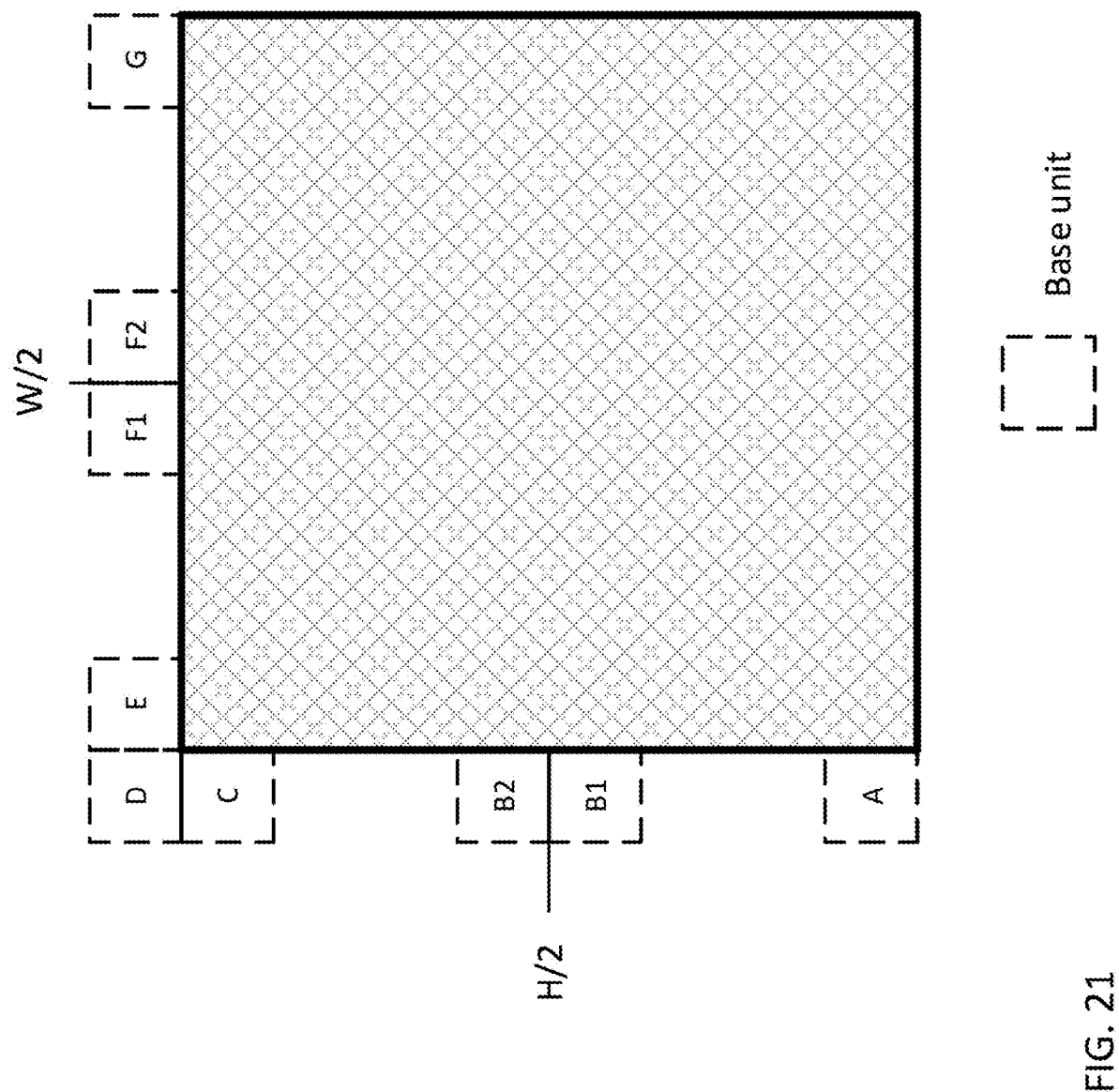
FIG. 21 shows an example of neighboring base unit positions that are checked to determine whether LIC is enabled.

Generally, a flag indicating that predicted sample should be updated using local illumination compensation method is signaled in the bitstream on the CU level. When a constraint is met, the flag value is inferred to 0 and the flag is not signaled in the bitstream. Exemplary constraints may comprise one or several of the following:

The predicted block contains less than 64 samples;
Block is predicted using a subblock mode, e.g. including triangle mode and BDOF;
The predicted block has a side length equal to 128 blocks;
The predicted block predicted samples are obtained using bi-prediction;
Base units located in the two top-left positions belonging to the reconstructed blocks that have non-INTER prediction mode (see FIG. 20). Specifically, they have coordinates (−1,0) and (0;−1) relative to the top left of the block to be predicted;
All the base units adjacent to the left and top side of the predicted block belong to the reconstructed blocks having non-INTER prediction mode;
Bi-prediction with weighted average (BPWA) was used to obtain predicted samples Checking the neighboring base units for a block of size W×H is shown in FIG. 21. Position "B" corresponds to either base unit positions marked as "B1" or "B2". Position "F" corresponds to a base unit position marked as either "F1" or "F2".

One or more positions shown in FIG. 21 may be used to derive whether LIC flag is signaled within the bitstream. In other words, in view of FIG. 21, for a block of size W×H the preset position may comprise one or more of positions A, B1, B2, C, D, E, F1, F2 or G, wherein A, B1, B2, C, D, E, F1, F2 and G which are defined as shown in FIG. 21.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.
x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

— Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs} = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \,\&\&\, y >= 0 \\ Atan\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x)

Clip1$_C$(x)=Clip3(0, (1<<BitDepth$_C$)−1, x)

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

-continued

Round($x$) = Sign($x$)*Floor(Abs($x$) + 0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)
"x++", "x− −"
"!x", "−x" (as a unary prefix operator)
$x^y$
"x * y", "x / y", "x ÷ y", "x/y", "x % y"
"x + y", "x − y"(as a two-argument operator), "

$$\sum_{i=x}^{y} f(i)"$$

TABLE-continued

Operation precedence from highest (at top of table) to lowest (at bottom of table)

"x << y", "x >> y"
"x < y", "x <= y", "x > y", "x >= y"
"x == y", "x != y"
"x & y"
"x | y"
"x && y"
"x | | y"
"x ? y : z"
"x..y"
"x = y", "x += y", "x −= y"

Text Description of Logical Operations

In the text, a statement of logical operations as would be described mathematically in the following form:

```
if( condition 0 )
  statement 0
else if( condition 1 )
  statement 1
...
else /* informative remark on remaining condition */
  statement n
``` may be described in the following manner:
... as follows / ... the following applies:
- If condition 0, statement 0
- Otherwise, if condition 1, statement 1
- ...
- Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . "statements can be identified by matching" . . . as follows" or " . . . the following applies" with the ending "Otherwise, . . . ".

In the text, a statement of logical operations as would be described mathematically in the following form:

```
if( condition 0a && condition 0b )
  statement 0
else if( condition 1a | | condition 1b )
  statement 1
...
else
  statement n
``` may be described in the following manner:
... as follows / ... the following applies:
- If all of the following conditions are true, statement 0:
  - condition 0a
  - condition 0b
- Otherwise, if one or more of the following conditions are true, statement 1:
  - condition 1a
  - condition 1b
- ...
- Otherwise, statement n In the text, a statement of logical operations as would be described mathematically in the following form:

```
if( condition 0 )
  statement 0
if( condition 1 )
  statement 1
```
may be described in the following manner:
  When condition 0, statement 0
  When condition 1, statement 1

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure provides the following further nineteen aspects.

A first aspect of a method for illumination compensation for inter prediction coding (encoding and/or decoding) of a picture, includes: obtaining inter-predicted sample values (e.g. for a current block, e.g. a current CU, of the picture) using motion compensation; obtaining a minimum value ($x_A$) and a maximum value ($x_B$) of neighboring samples (e.g. from a set L of neighboring samples of the reference block, which may comprise all or only a part of all neighboring samples; the neighboring samples may be neighboring decoded samples) of a reference block (or of two or more reference blocks), and corresponding positions A (of the sample having the minimum value) and B (of the sample having the maximum value) relative to the position of the reference block; obtaining the respective values of neighboring samples ($y_A$, $y_B$) (e.g. from a set C of neighboring samples of the current block which may comprise all or only a part of all neighboring samples, both sets L an C may comprise the same neighboring samples with regard to their relative position to the respective block L and C; the neighboring samples may be neighboring reconstructed samples) of the current block at the obtained positions A and B relative to the position of the current block; obtaining the values of updating parameters (e.g. $\alpha$ and $\beta$) using the calculated values; and updating the values of the inter-predicted samples based on the updating parameters (e.g. $\alpha$ and $\beta$).

According to a second aspect of a method of the first aspect, the updating parameters may be $\alpha$ and $\beta$, and values of the updating parameters $\alpha$ and $\beta$ may be obtained using the calculated values as follows:

$$\alpha = \frac{y_B - y_A}{x_B - x_A}$$

$$\beta = y_A - \alpha x_A.$$

According to a third aspect of a method according to the second aspect, the values of the inter-predicted samples may be updated as follows:

$$\text{pred}'(x,y) = \alpha \cdot \text{pred}(x,y) + \beta$$

According to a fourth aspect of a method according to one any of the previous aspects, a position A and position B may be selected from a subset of a set (e.g. set L) of neighboring samples of the reference block (L can comprise all neighboring samples at integer pixel positions).

According to a fifth aspect of a method according to the previous aspect, a second-smallest value ($x_{A'}$), e.g. a luma value at a position A', and a second-largest value ($x_{B'}$), e.g. a luma value at a position B', of the neighboring samples of the reference block may additionally be used for calculating the updating parameters (e.g. $\alpha$ and $\beta$).

According to a sixth aspect of a method according to any one of the previous aspects, a lookup table (LUT) may be used to derive parameter $\alpha$ (e.g. the lookup table comprises the results of the division derivation as specified for $\alpha$ in the second aspect).

According to a seventh aspect of a method according to the sixth aspect, a lookup table may be linearly mapped to the difference $x_B - x_A$.

According to an eighth aspect of a method according to the seventh aspect, a lookup table may be non-linearly mapped to the difference $x_B - x_A$.

According to a ninth aspect of a method according to the eighth aspect, a lookup table may tabulates or include the values of significands.

According to an tenth aspect of a method according to any of the previous aspects, a set of neighboring samples of the reference block (e.g. set L) and a set of neighboring samples of the current block (e.g. set C) may not include all neighboring samples (e.g. not all neighboring samples at integer pixel positions) but only samples adjacent to the corner and the middle of the reference and current block.

According to an eleventh aspect of a method according to any one of the first to tenth aspects, a set of neighboring samples of the reference block (e.g. set L) and a set of neighboring samples of the current block (e.g. set C) may not include all neighboring samples (e.g. not all neighboring samples at integer pixel positions) but only samples that have a distance to the top-left corner exceeding the given threshold.

According to a twelfth aspect of a method according to any one of the previous aspects, several reference blocks (for example two or more) may be used for motion compensation and for obtaining the updating parameters.

According to a thirteenth aspect of a method according to any one of the first to twelfth aspects, the method may be implemented by an encoding device.

According to a fourteenth aspect of a method according to any one of the first to twelfth aspects, the method may be implemented by a decoding device.

According to a fifteenth aspect, an encoder may include processing circuitry for carrying out the method according to any one of the first to twelfth aspects.

According to a sixteenth aspect, a decoder may include processing circuitry for carrying out the method according to any one of the first to twelfth aspects.

According to an seventeenth aspect, a computer program product may include a program code for performing the method according to any one of the first to twelfth aspects.

According to an eighteenth aspect, a decoder is provided, which includes: one or more processors; and a non-transitory computer-readable storage medium coupled to the processors and storing programming for execution by the processors, wherein the programming, when executed by the processors, configures the decoder to carry out the method according to any one of the first to twelfth aspects.

According to a nineteenth aspect, an encoder is provided, which includes: one or more processors; and a non-transitory computer-readable storage medium coupled to the processors and storing programming for execution by the processors, wherein the programming, when executed by the processors, configures the encoder to carry out the method according to any one of the first to twelfth aspects.

In addition, the present disclosure provides also the following further fifty aspects.

According to a first aspect of a method for illumination compensation of a predicted block for inter prediction coding, the method includes:
  determining prediction modes for blocks neighboring to left and top side of predicted block;
  determine the sampling template (T) on the basis of the determined prediction modes of blocks neighboring to left and top side of predicted block;
  determining a set of reconstructed samples (S) that are neighboring to the left side or to the top side of the predicted block and that have a position relative to the predicted block that is permitted by the sampling template T;
  determining a set of reference samples (R) that are neighboring to the left side or to the top side of the reference area and that have a position relative to the reference area that is permitted by the sampling template T;
  deriving parameters of linear model using samples of the set of reference samples R as reference values and reconstructed samples of the set of reconstructed samples S as target values; and
  applying linear transform to the samples of the predicted block, wherein parameters of linear transform are the derived parameters of linear model.

According to a second aspect of the method according to the first aspect, deriving parameters of linear model may include the following steps:
  obtaining a first target value ($x_A$) and a second target value ($x_B$) of reference samples (such as neighboring samples) of at least one reference block and a corresponding position A of the reference sample having the first target value and a corresponding position B of the reference sample having the second target value relative to the position of the reference block;
  obtaining respective values ($y_A$, $y_B$) of reference samples (such as neighboring samples) of the current block at the corresponding positions A and B relative to the position of the current block;
  obtaining or deriving the values of updating parameters (such as $\alpha$ and $\beta$) based on the values of reference samples, wherein the values of reference samples comprises one or more of the first target value ($x_A$) and the second target value ($x_B$) of the reference sample of the reference block, and the values of reference samples ($y_A$, $y_B$) of the current block at the corresponding positions A and B; and
  updating the values of the inter-predicted samples based on the values of the updating parameters (such as $\alpha$ and $\beta$).

According to a third aspect of the method according to any one of the previous aspects, the updating parameters may be $\alpha$ and $\beta$, and values of the updating parameters $\alpha$ and $\beta$ may be obtained using the calculated values as follows:

$$\alpha = \frac{y_B - y_A}{x_B - x_A}$$

$$\beta = y_A - \alpha x_A.$$

According to a fourth aspect of a method according to the previous aspect, the values of the inter-predicted samples may be updated as follows:

pred'($x,y$)=α·pred($x,y$)+β

According to a fifth aspect of a method of according to any of the previous aspects, a position A and position B may be selected from a subset of a set (e.g. a set L) of neighboring samples of the reference block (L can comprise all neighboring samples at integer pixel positions).

According to a sixth aspect of a method according to the previous aspect, a second-smallest value ($x_{A'}$), (e.g. a sample value at a position A'), and a second-largest value ($x_{B'}$), (e.g. a sample value at a position B'), of the neighboring samples of the reference block may be additionally used for calculating the updating parameters (e.g. α and β).

According to a seventh aspect of a method according to any one of the preceding aspects, a lookup table (LUT) may be used to derive parameter α (e.g. the lookup table comprises the results of the division derivation as specified for α in the second aspect).

According to an eighth aspect according to the method of the previous aspect, a lookup table may be linearly mapped to the difference $x_B - x_A$.

According to a ninth aspect of a method according to the previous aspect, a lookup table may be non-linearly mapped to the difference $x_B - x_A$.

According to a tenth aspect of a method according to the previous aspect, a lookup table may include the values of significands.

According to an eleventh aspect of a method according to any one of the preceding aspects, a set of neighboring samples of the reference block (e.g. a set L) and a set of neighboring samples of the current block (e.g. a set C) may not include all neighboring samples (e.g. do not include all neighboring samples at integer pixel positions), but include samples adjacent to the corner and the middle of the reference and current block.

According to a twelfth aspect of a method according to any one of the first to tenth aspects, a set of neighboring samples of the reference block (e.g. a set L) and a set of neighboring samples of the current block (e.g. a set C) may not include all neighboring samples (e.g. do not include all neighboring samples at integer pixel positions), but include samples that have a distance to the top-left corner exceeding a given threshold (such as, the threshold can be defined as ¼ of side length).

According to a thirteenth aspect of a method according to any one of the preceding aspects, several reference blocks (for example two or more) may be used for motion compensation (such as Local Illumination Compensation) and for obtaining the linear model coefficients (such as updating parameters (e.g. α and β)).

According to fourteenth aspect of a method according to any one of the preceding aspects, mean values of top and left template samples of the current and reference blocks may be used to calculate one or more linear model parameters for motion compensation (such as Local Illumination Compensation, LIC).

According to a fifteenth aspect of a method according to any one of the preceding aspects, templates of the current and reference blocks may be used without downsampling them.

According to a sixteenth aspect of a method according to any one of the preceding aspects, top and left template samples of the current and reference blocks may be filtered before linear model parameter derivation or linear model coefficient derivation.

According to a seventeenth aspect of a method according to any one of the preceding aspects, a linear model parameter derivation or linear model coefficient derivation may be unified for cross-component prediction (CCLM) and local illumination compensation (LIC).

According to an eighteenth aspect of a method according to any one of the preceding aspects, the first target value and the second target value of reference (neighboring) samples of the reference block may respectively be a minimum value ($x_A$) and a maximum value ($x_B$) of a second set of neighboring samples of the reference block; and the position A of the reference sample having the first target value and the position B of the reference sample having the second target value may be a corresponding position A of the neighboring sample having the minimum value and a corresponding position B of the neighboring sample having the maximum value relative to the position of the reference block.

According to a nineteenth aspect of a method according to any one of the preceding aspects, the first target value may be a first averaged value of the smallest sample value A and the second-smallest sample value A' of the second set of neighboring samples of the reference block; the second target value may be a second averaged value of the largest sample value B and the second-largest sample value B' of the second set of neighboring samples of the reference block; and the position A of the reference sample having the first target value and the position B of the reference sample having the second target value may be a corresponding position of the neighboring sample having the first averaged value and a corresponding position of the neighboring sample having the second averaged value relative to the position of the reference block.

According to a twentieth aspect of a method according to any one of the preceding aspects, the values of reference samples may further include a mean value of top template samples and left template samples of the current block and a mean value of top template samples and left template samples of the reference block.

According to a twenty-first aspect of a method according to any one of the preceding aspects, when the quantity of reference samples having the minimum value is Q among the second set of neighboring samples of the reference block, the corresponding position A of the reference sample may be the reference sample having the minimum value and having the maximum distance to the top-left corner of the reference block, and/or the corresponding position B of the reference sample may be the reference sample having the maximum value and having the maximum distance to the top-left corner of the reference block.

According to a twenty-second aspect of a method according to any one of the preceding aspects, the updating parameters (such as α and/or β) may be derived from the value of a first set of reference samples of the current block and the value of a second set of reference samples of the reference block by using mean calculation.

According to a twenty-third aspect of a method for illumination compensation for inter prediction coding, the method may include:
  obtaining inter-predicted sample values for a current block using motion compensation;
  obtaining or deriving values of first and second updating parameters (such as α and β) based on the value of a first set of reference samples (such as neighboring samples) of the current block and the value of a second set of reference samples (such as neighboring samples) of the reference block, wherein the value of the first updating parameter (such as α) is obtained (or derived or calculated) by using a first method, and the value of the second updating parameter (such as β) is obtained (or derived or calculated) by using a second method; and updating the values of the inter-predicted samples based on the values of the first and second updating parameters (such as α and β).

According to a twenty-fourth aspect of a method according to any one of the preceding aspects, the value of the first updating parameter (such as α) may be obtained (or derived or calculated) by using MinMax method, and the value of the second updating parameter (such as β) may be obtained (or derived or calculated) by using mean calculation.

According to a twenty-fifth aspect of a method according to any one of the preceding aspects, the value of the first updating parameter (such as α) may be obtained (or derived or calculated) based on a minimum value ($x_A$) and a maximum value ($x_B$) of the second set of reference samples of the reference block, and respective values ($y_A$, $y_B$) of reference samples of the first set of reference samples of the current block at corresponding positions A and B of the minimum value ($x_A$) and maximum value ($x_B$).

According to a twenty-sixth aspect of a method according to any one of the preceding aspects, the value of the first updating parameter (such as α) may be obtained (or derived or calculated) based on a minimum value ($x_A$) and a maximum value ($x_B$) of the second set of reference samples of the reference block, and respective values ($y_A$, $y_B$) of reference samples (such as neighboring samples) of the first set of reference samples of the current block at corresponding positions A and B relative to the position of the current block; wherein the corresponding position A of the reference sample may have the minimum value and the corresponding position B of the reference sample may have the maximum value relative to the position of the reference block.

According to a twenty-seventh aspect of a method according to any one of the preceding aspects, the value of the first updating parameter (such as α) may be obtained (or derived or calculated) based on a first averaged value of the smallest sample value (A) and the second-smallest sample value (A') of the second set of reference samples of the reference block and a second averaged value of the largest sample value (B) and the second-largest sample value (B') of the second set of neighboring samples of the reference block, and respective values ($y_A$, $y_B$) of reference samples (such as neighboring samples) of the first set of reference samples of the current block at corresponding positions A and B of the first averaged value and the second averaged value.

According to a twenty-eighth aspect of a method according to any one of the preceding aspects, the value of the first updating parameter (such as α) may be obtained (or derived or calculated) based on a first averaged value of the smallest sample value (A) and the second-smallest sample value (A') of the second set of reference samples of the reference block and a second averaged value of the largest sample value (B) and the second-largest sample value (B') of the second set of reference samples (such as neighboring samples) of the reference block, and respective values ($y_A$, $y_B$) of reference samples (such as neighboring samples) of the first set of reference samples of the current block at corresponding positions A and B relative to the position of the current block; the corresponding position A of the reference sample may have the first averaged value and the corresponding position B of the reference sample has the second averaged value relative to the position of the reference block.

According to a twenty-ninth aspect of a method according to any one of the preceding aspects, the value of a second parameter (such as β) may be obtained (or derived or calculated) based on a mean value of a first set of reference samples (such as neighboring reconstructed samples) of the current block and a mean value of a second set of reference samples (such as neighboring reconstructed samples) of the reference block.

According to a thirtieth aspect of a method according to any one of the preceding aspects, when a first condition is met (e.g. a first template sample range (such as W) is larger than a second template sample range (such as H)), a mean value of a second set of reference samples (such as neighboring reconstructed samples) of the reference block may be obtained (or derived or calculated) using a first formulation; when a second condition is met (e.g. a second template sample range (such as H) is larger than a first template sample range (such as W)), a mean value of a second set of reference samples (such as neighboring reconstructed samples) of the reference block may be obtained (or derived or calculated) using a second formulation; when a third condition is met (e.g. a second template sample range (such as H) is equal to a first template sample range (such as W)), a mean value of a second set of reference samples (such as neighboring reconstructed samples) of the reference block may be obtained (or derived or calculated) using a third formulation.

According to a thirty-first aspect of a method according to any one of the preceding aspects, when a first condition is met (e.g. a first template sample range (such as W) is larger than a second template sample range (such as H)), a mean value of a first set of reference samples (such as neighboring reconstructed samples) of the current block may be obtained (or derived or calculated) using a first formulation; when a second condition is met (e.g. a second template sample range (such as H) is larger than a first template sample range (such as W)), a mean value of a first set of reference samples (such as neighboring reconstructed samples) of the current block may be obtained (or derived or calculated) using a second formulation; when a third condition is met (e.g. a second template sample range (such as H) is equal to a first template sample range (such as W)), a mean value of a first set of reference samples (such as neighboring reconstructed samples) of the current block may be obtained (or derived or calculated) using a third formulation.

According to a thirty-second aspect of a method according to any one of the preceding aspects, the first set of reference samples (such as neighboring reconstructed samples) of the current block may include a part or whole of the top and left template samples of the current block; and the second set of reference samples (such as neighboring reconstructed samples) of the reference block may include a part or whole of the top and left template samples of the reference block.

According to a thirty-third aspect of a method according to any one of the preceding aspects, the top and left template samples of the current and reference blocks may be filtered before updating parameter derivation (or linear model parameter derivation); the first set of reference samples of the current block may be filtered before updating parameter derivation (or linear model parameter derivation); or the second set of reference samples of the reference block may be filtered before updating parameter derivation (or linear model parameter derivation).

According to a thirty-fourth aspect, a method according to any one of the preceding aspects 1-33 may be implemented by an encoding device.

According to a thirty-fifth aspect, a method according to any one of the preceding aspects 1-33 may be implemented by a decoding device.

According to a thirty-sixth aspect, an encoder is provided that includes comprising processing circuitry for carrying out the method according to any one of the previous aspects 1 to 33.

According to a thirty-seventh aspect, a decoder is provided that includes processing circuitry for carrying out the method according to any one of the previous aspects 1 to 33.

According to a thirty-eighth aspect, a computer program product is provided that includes a program code for performing the method according to any one of the previous aspects 1 to 33.

According to a thirty-ninth aspect, a decoder is provided that includes: one or more processors; and a non-transitory computer-readable storage medium coupled to the processors and storing programming for execution by the processors, wherein the programming, when executed by the processors, configures the decoder to carry out the method according to any one of the previous aspects 1 to 33.

According to a fortieth aspect, an encoder is provided that includes: one or more processors; and a non-transitory computer-readable storage medium coupled to the processors and storing programming for execution by the processors, wherein the programming, when executed by the processors, configures the encoder to carry out the method according to any one of the previous aspects 1 to 33.

According to a forty-first aspect, a non-transitory computer-readable medium is configured to carry a program code which, when executed by a computer device, causes the computer device to perform the method of any one of the previous aspects 1 to 33.

According to a forty-second aspect, an apparatus is provided for illumination compensation for inter prediction coding, which includes:
- a first obtaining unit, configured for obtaining inter-predicted sample values for a current block using motion compensation;
- a second obtaining unit, configured for obtaining a first target value ($x_A$) and a second target value ($x_B$) of reference samples (such as neighboring samples) of at least one reference block and a corresponding position A of the reference sample having the first target value and a corresponding position B of the reference sample having the second target value relative to the position of the reference block;
- a third obtaining unit, configured for obtaining respective values ($y_A$, $y_B$) of reference samples (such as neighboring samples) of the current block at the corresponding positions A and B relative to the position of the current block;
- a fourth obtaining unit, configured for obtaining or deriving the values of updating parameters (such as $\alpha$ and $\beta$) based on the values of reference samples, wherein the values of reference samples comprises one or more of the first target value ($x_A$) and the second target value ($x_B$) of the reference sample of the reference block, and the values of reference samples ($y_A$, $y_B$) of the current block at the corresponding positions A and B; and
- an updating unit, configured for updating the values of the inter-predicted samples based on the values of the updating parameters (such as $\alpha$ and $\beta$).

According to a forty-third aspect, an apparatus is provided for illumination compensation for inter prediction coding, which includes:
- a first obtaining unit, configured for obtaining inter-predicted sample values for a current block using motion compensation;
- a second obtaining unit, configured for obtaining or deriving values of first and second updating parameters (such as $\alpha$ and $\beta$) based on the value of a first set of reference samples (such as neighboring samples) of the current block and the value of a second set of reference samples (such as neighboring samples) of the reference block, wherein the value of the first updating parameter (such as $\alpha$) is obtained (or derived or calculated) by using a first method, and the value of the second updating parameter (such as $\beta$) is obtained (or derived or calculated) by using a second method; and
- an updating unit, configured for updating the values of the inter-predicted samples based on the values of the first and second updating parameters (such as $\alpha$ and $\beta$).

According to a forty-fourth aspect, a method is provided for illumination compensation of a predicted block for inter prediction coding, which includes:
- deriving prediction modes of neighboring blocks of a current block, wherein the neighboring blocks are on the top or left side of the current block;
- determining availability of one or more samples in the neighboring blocks based on the prediction modes, wherein the one or more samples are adjacent to the top or left boundary of the current block;
- deriving a first sample set, wherein the first sample set comprises first samples determined as available;
- deriving a second sample set, wherein the second sample set comprises second samples, wherein each second sample corresponds to each first sample, wherein a position relationship between each second sample and a reference block is the same as a position relationship between the corresponding first sample and the current block, and wherein the reference block corresponds to the current block;
- calculating one or more parameters based on the first sample set and the second sample set; and applying linear transform to samples in the current block with the one or more parameters.

According to a forty-fifth aspect of a method according to the forty-fourth aspect, determining availability of the one or more samples in the neighboring blocks may be based on the prediction modes, and may include: the one or more samples in one of the neighboring blocks are being, in the case the prediction mode of the neighboring block is inter mode.

According to a forty-sixth aspect of a method according to the forty-fourth aspect, the determining availability of the one or more samples in the neighboring blocks based on the prediction modes, may include: the one or more samples in one of the neighboring blocks being unavailable, in the case the prediction mode of the neighboring block is not inter mode.

According to a forty-seventh aspect of a method according to the previous aspect, the prediction mode of the neighboring block may not be inter mode, and may include: the prediction mode of the neighboring block being intra mode, combined intra-inter prediction mode (CIIP), intra block copy mode (IBC) or a mode based on current picture referencing (CPR) mechanisms.

According to a forty-eighth aspect of a method of any one of claims forty-fourth to forty-seventh aspects, the method may be disabled in the case one or more predetermined conditions being satisfied, and the predetermined conditions may include: the current block contains less than 64 samples; or the current block is predicted using a sub-block mode or bi-prediction; or the width or the height of the current block is 128 samples; or the prediction modes of neighboring reconstructed blocks on the top-left corner and adjacent to the top or left boundary of the current block are not inter mode; or all prediction modes of neighboring reconstructed blocks adjacent to the top or left boundary of the current block are not inter mode; or the prediction modes of neighboring reconstructed blocks on preset position and adjacent to the top or left boundary of the current block are not inter mode.

According to a forty-ninth aspect of a method according to the previous aspect, the sub-block mode may include triangle mode or BDOF mode.

According to a fiftieth aspect of the method according to the forty-eighth aspect, the preset position comprises A, B1, B2, C, D, E, F1, F2 or G as shown in FIG. 21.

What is claimed is:

1. A method for illumination compensation for inter prediction coding of a picture, the method comprising:
    obtaining inter-predicted sample values for a current block of the picture using motion compensation;
    obtaining a first target value and a second target value of neighboring samples from a set L of neighboring samples of a reference block of the current block, wherein the set L comprises all or part of all of the neighboring samples of the reference block of the current block;
    obtaining a corresponding position A of a sample having the first target value and a corresponding position B of a sample having the second target value relative to a position of the reference block;
    obtaining respective values of neighboring samples of the current block at the obtained position A and the obtained position B relative to a position of the current block, wherein the relative positions of the neighboring samples of the reference block and the current block match;
    obtaining values of updating parameters as calculated values using the first target value and the second target value of the neighboring samples from the set L of neighboring samples of the reference block and the respective values of the neighboring samples of the current block; and
    updating the inter-predicted sample values based on the updating parameters,
    wherein the first target value is a first averaged value of a smallest sample value A and a second-smallest sample value A' of a second set of the neighboring samples of the reference block;
    wherein the second target value is a second averaged value of a largest sample value B and a second-largest sample value B' of the second set of the neighboring samples of the reference block;
    wherein the position A of the reference sample having the first target value and the position B of the reference sample having the second target value are a corresponding position of the neighboring sample having the first averaged value and a corresponding position of the neighboring sample having the second averaged value relative to the position of the reference block,
    wherein the obtained respective values of the neighboring samples are obtained from a set C of the neighboring samples of the current block, wherein the set C comprises all or part of all of the neighboring samples, and
    wherein the set L of the neighboring samples of the reference block and the set C of the neighboring samples of the current block do not include all of the neighboring samples, but include samples that have a distance to a top-left corner exceeding a predetermined threshold.

2. The method according to claim 1, wherein both the set L and the set C comprise the same neighboring samples with regard to their relative position to a respective block L and block C.

3. The method according to claim 1, the method comprising:
    determining prediction modes for blocks neighboring to a left side and a top side of a predicted block;
    determining a sampling template based on the determined prediction modes of the blocks neighboring to the left side and the top side of the predicted block;
    determining a set of reconstructed samples that are neighboring to the left side or to the top side of the predicted block and that have a position relative to the predicted block that is permitted by the sampling template T;
    determining a set of reference samples that are neighboring to the left side or to the top side of a reference area and that have a position relative to the reference area that is permitted by the sampling template T;
    deriving parameters of a linear model using samples of the set of reference samples as reference values and reconstructed samples of the set of reconstructed samples as target values; and
    applying a linear transformation to samples of the predicted block, wherein parameters of the linear transformation are the derived parameters of the linear model.

4. The method of claim 3, wherein the deriving parameters of linear model comprises:
    obtaining the first target value and the second target value of reference block reference samples, wherein the reference block reference samples are from the neighboring samples of the reference block, the corresponding position A of the reference block reference samples have the first target value, and the corresponding position B of the reference block reference samples have the second target value relative to the position of the reference block;
    obtaining respective values of neighbor reference samples, wherein the neighbor reference samples are from the neighboring samples of the current block at the corresponding position A and the corresponding position B relative to the position of the current block;
    obtaining or deriving the values of the updating parameters based on values of reference samples, wherein the values of the reference samples comprise one or more of the first target value ($x_A$) and the second target value ($x_B$) of the reference block reference samples of the reference block, and the obtained respective values of the neighbor reference samples of the current block at the corresponding position A and the corresponding position B; and
    updating the inter-predicted sample values based on the values of the updating parameters.

5. The method according to claim 1, wherein the updating parameters are α and β, wherein the values of the updating parameters α and β are obtained using calculated values according to the following equations:

$$\alpha = \frac{y_B - y_A}{x_B - x_A} \qquad (E1)$$

$$\beta = y_A - \alpha x_A; \qquad (E2)$$

wherein $x_A$ is the first target value and $x_B$ is the second target value, and wherein the inter-predicted sample values s are updated as follows:

$$\text{pred}'(x,y) = \alpha \cdot \text{pred}(x,y) + \beta.$$

6. The method according to claim 1, wherein the values of reference samples further comprises a mean value of top template samples and left template samples of the current block and a mean value of top template samples and left template samples of the reference block, or wherein in a state where a quantity of reference samples having a minimum value is Q among the second set of the neighboring samples of the reference block, the corresponding position A of the reference sample is the reference sample having the minimum value and having a maximum distance to the top-left corner of the reference block, or the corresponding position B of the reference sample is the reference sample having a maximum value and having the maximum distance to the top-left corner of the reference block.

7. The method according to claim 1, wherein the updating parameters are derived from a value of a first set of reference samples of the current block and a value of the second set of reference samples of the reference block by using mean calculation.

8. A method for illumination compensation for inter prediction coding, the method comprising:

obtaining inter-predicted sample values for a current block using motion compensation;

obtaining or deriving a value of first updating parameter and a value of a second updating parameter based on a value of a first set of reference samples of the current block and a value of a second set of reference samples of a reference block, wherein the value of the first updating parameter is obtained by using a first method, and the value of the second updating parameter is obtained by a second method based on a mean calculation; and updating the inter-predicted sample values based on the values of the first updating parameter and the second updating parameter, wherein the value of the first updating parameter is obtained based on a first averaged value of a smallest sample value and a second-smallest sample value of the second set of reference samples of the reference block and a second averaged value of a largest sample value and a second-largest sample value of the second set of neighboring samples of the reference block, and respective values of reference samples of the first set of reference samples of the current block at a corresponding position A and a corresponding position B of the first averaged value and the second averaged value, respectively, wherein the obtained respective values of the neighboring samples are obtained from a first set of the neighboring samples of the current block, wherein the first set of neighboring samples comprises all or part of all of the neighboring samples, and wherein the second set of the neighboring samples of the reference block and the first set of the neighboring samples of the current block do not include all of the neighboring samples, but include samples that have a distance to a top-left corner exceeding a predetermined threshold.

9. The method according to claim 8, wherein the corresponding position A of the reference sample has the first averaged value and the corresponding position B of the reference sample has the second averaged value relative to the position of the reference block.

10. The method according to claim 8, wherein the value of the second updating parameter is obtained based on a mean value of the first set of reference samples of the current block and a mean value of the second set of reference samples of the reference block.

11. A non transitory computer-readable medium comprising a program code for performing the method according to claim 1.

12. A decoder, comprising:
one or more processors; and
a non-transitory computer-readable storage medium coupled to the processors and storing programming for execution by the processors, wherein the programming, when executed by the processors, configures the decoder to carry out the method according to claim 1.

13. An encoder, comprising:
one or more processors; and
a non-transitory computer-readable storage medium coupled to the processors and storing programming for execution by the processors, wherein the programming, when executed by the processors, configures the encoder to carry out the method according to claim 1.

* * * * *